(12) United States Patent
Noh et al.

(10) Patent No.: US 11,831,438 B2
(45) Date of Patent: Nov. 28, 2023

(54) METHOD AND APPARATUS FOR TRANSMISSION AND RECEPTION OF HARQ-ACK FEEDBACK IN WIRELESS COMMUNICATION SYSTEM

(71) Applicant: Samsung Electronics Co., Ltd., Gyeonggi-do (KR)

(72) Inventors: Hoondong Noh, Gyeonggi-do (KR); Euichang Jung, Gyeonggi-do (KR); Jinhyun Park, Gyeonggi-do (KR); Heecheol Yang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 189 days.

(21) Appl. No.: 16/841,936

(22) Filed: Apr. 7, 2020

(65) Prior Publication Data

US 2020/0328849 A1    Oct. 15, 2020

(30) Foreign Application Priority Data

| Apr. 9, 2019 | (KR) | 10-2019-0041489 |
| May 10, 2019 | (KR) | 10-2019-0055241 |
| May 14, 2019 | (KR) | 10-2019-0056583 |

(51) Int. Cl.
    *H04L 1/1812*    (2023.01)
    *H04W 72/21*    (2023.01)
    *H04W 72/23*    (2023.01)

(52) U.S. Cl.
    CPC ........... *H04L 1/1812* (2013.01); *H04W 72/21* (2023.01); *H04W 72/23* (2023.01)

(58) Field of Classification Search
    CPC ........... H04W 72/0413; H04W 72/042; H04W 72/1268; H04W 72/21; H04W 72/23;
    (Continued)

(56) References Cited

U.S. PATENT DOCUMENTS 11,018,811 B2 * 5/2021 Amuru ............... H04L 1/1864
11,330,569 B2 * 5/2022 Kundu ............... H04L 1/1819
(Continued)

FOREIGN PATENT DOCUMENTS

| JP | 6423471 | 11/2018 |
| WO | WO 2018/204491 | 11/2018 |

OTHER PUBLICATIONS

Huawei, HiSilicon, "Enhancements on Multi-TRP/Panel Transmission", R1-1901567, 3GPP TSG RAN WG1 Meeting #96, Feb. 25-Mar. 1, 2019, 14 pages.
(Continued)

*Primary Examiner* — Hanh N Nguyen
(74) *Attorney, Agent, or Firm* — The Farrell Law Firm, P.C.

(57) ABSTRACT

The disclosure relates to a communication scheme and system for converging a $5^{th}$ generation (5G) communication system for supporting a data rate higher than that of a $4^{th}$ generation (4G) system with an internet of things (IoT) technology. The disclosure is applicable to intelligent services (e.g., smart home, smart building, smart city, smart car or connected car, health care, digital education, retail, and security and safety-related services) based on the 5G communication technology and the IoT-related technology. An operation method of a terminal for receiving data from multiple Transmission and Reception Points (TRPs) participated in non-coherent joint transmission is disclosed. The method includes receiving information on HARQ-ACK codebook configuration and configuring and transmitting HARQ-ACK codebooks corresponding to the multiple TRPs based on the received information.

16 Claims, 21 Drawing Sheets

(58) Field of Classification Search
CPC ... H04L 1/1812; H04L 5/0053; H04L 1/1671; H04L 1/1864; H04L 5/0055; H04L 1/1854
See application file for complete search history.

(56) References Cited

U.S. PATENT DOCUMENTS

| | | | |
|---|---|---|---|
| 2017/0310375 A1* | 10/2017 | Kim | H04B 7/0478 |
| 2017/0310429 A1* | 10/2017 | Wang | H04L 1/1861 |
| 2019/0103943 A1 | 4/2019 | Wang et al. | |
| 2019/0253196 A1* | 8/2019 | Medles | H04W 72/1268 |
| 2019/0349942 A1* | 11/2019 | Li | H04L 5/0055 |
| 2020/0036480 A1* | 1/2020 | Yang | H04B 7/0645 |
| 2020/0281011 A1* | 9/2020 | Xiong | H04B 7/0623 |
| 2020/0305088 A1* | 9/2020 | Nory | H04B 7/0626 |
| 2021/0184801 A1* | 6/2021 | El Hamss | H04L 1/1819 |
| 2021/0306113 A1* | 9/2021 | Lei | H04L 5/0055 |
| 2022/0046691 A1* | 2/2022 | Kim | H04L 1/1861 |
| 2022/0287054 A1* | 9/2022 | Kim | H04W 72/1289 |
| 2022/0353046 A1* | 11/2022 | Matsumura | H04L 1/1861 |
| 2022/0353698 A1* | 11/2022 | Jang | H04W 72/042 |

OTHER PUBLICATIONS

Samsung, "Discussion on HARQ-ACK Codebook for NR-U", R1-1902265, 3GPP TSG RAN WG1 #96, Feb. 25-Mar. 1, 2019, 6 pages.
Catt, "Remaining Issues on HARQ-ACK Codebook", R1-1806301, 3GPP TSG RAN WG1 Meeting #93, May 21-25, 2018, 7 pages.
MediaTek Inc., "Discussion on Separate UCI Encoding for Long-PUCCH", R1-1719571, 3GPP TSG RAN WG1 Meeting 91, Nov. 27-Dec. 1, 2017, 4 pages.
Fujitsu, "Considerations on HARQ-ACK Feedback for NR-V2X Unicast", R1-1812411, 3GPP TSG RAN WG1 Meeting #95, Nov. 12-16, 2018, 5 pages.
International Search Report dated Jul. 9, 2020 issued in counterpart application No. PCT/KR2020/004751, 2 pages.
LG Electronics, "Enhancements on Multi-TRP/Panel Transmission", R1-1904208, 3GPP TSG RAN WG1 Meeting #96bis, Apr. 8-12, 2019, 14 pages.
NTT Docomo, Inc., "Enhancements on Multi-TRP/Panel Transmission", R1-1904966, 3GPP TSG RAN WG1 #96bis, Apr. 8-12, 2019, 29 pages.
European Search Report dated Nov. 19, 2021 issued in counterpart application No. 20788128.5-1213, 10 pages.

* cited by examiner

METHOD AND APPARATUS FOR TRANSMISSION AND RECEPTION OF HARQ-ACK FEEDBACK IN WIRELESS COMMUNICATION SYSTEM

CROSS-REFERENCE TO RELATED APPLICATION(S)

This application is based on and claims priority under 35 U.S.C. § 119 to Korean Patent Application No. 10-2019-0041489, which was filed in the Korean Intellectual Property Office on Apr. 9, 2019, 10-2019-0055241, which was filed in the Korean Intellectual Property Office on May 10, 2019, and 10-2019-0056583, which was filed in the Korean Intellectual Property Office on May 14, 2019, the entire disclosure of each of which is incorporated herein by reference.

BACKGROUND

1. Field

The disclosure relates generally to a wireless communication system and, in particular, to a codebook configuration method and apparatus for hybrid automatic repeat request (HARQ-ACK) feedback of a terminal.

2. Description of Related Art

To meet the demand for wireless data traffic having increased since deployment of $4^{th}$ generation (4G) communication systems, efforts have been made to develop an improved $5^{th}$ generation (5G) or pre-5G communication system. The 5G or pre-5G communication system may also be referred to as a 'beyond 4G network' or a 'post long term evolution (LTE) system'.

The 5G communication system will be implemented in higher frequency (mmWave) bands, e.g., 60 GHz bands, in order to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are being discussed for use in 5G communication systems.

In addition, in 5G communication systems, development for system network improvement is under way based on advanced small cells, cloud radio access networks (RANs), ultra-dense networks, device-to-device (D2D) communication, wireless backhaul, moving networks, cooperative communication, coordinated multi-points (CoMP), reception-end interference cancellation, etc. In the 5G system, Hybrid frequency shift keying (FSK) and quadrature amplitude modulation (QAM) (FQAM) and sliding window superposition coding (SWSC) have been developed as an advanced coding modulation (ACM), and filter bank multi carrier (FBMC), non-orthogonal multiple access (NOMA), and sparse code multiple access (SCMA) have been developed as an advanced access technology.

The Internet is now evolving to the Internet of things (IoT) where distributed entities, i.e., things, exchange and process information. The Internet of everything (IoE), which is a combination of IoT technology and Big Data processing technology through connection with a cloud server, has also emerged. As technology elements, such as "sensing technology", "wired/wireless communication and network infrastructure", "service interface technology", and "security technology" have been demanded for IoT implementation, a sensor network, machine-to-machine (M2M) communication, machine type communication (MTC), etc., have been researched. Such an IoT environment may provide intelligent Internet technology services that collect and analyze data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology is also an example of a convergence between the 5G technology and the IoT technology.

Wireless communication systems that advance with the employment of the above-described technologies are likely to be able to provide various types of services, and will require a method for facilitating provision of the services.

SUMMARY

An aspect of the disclosure is to provide a codebook configuration method and apparatus for HARQ-ACK feedback of a terminal in a wireless communication system.

In accordance with an aspect of the disclosure, a method performed by a terminal is provided. The method includes receiving information configuring a feedback of acknowledgement/negative acknowledgement (ACK/NACK) as a separate feedback or a joint feedback; generating a first hybrid automatic repeat request acknowledgement (HARQ-ACK) codebook associated with physical downlink shared channel (PDSCH) corresponding to a first control resource set (CORESET) with a first index value; generating a second HARQ-ACK codebook associated with PDSCH corresponding to a second CORESET with a second index value; obtaining, in case that the joint feedback is configured, HARQ-ACK information bits by concatenating the first HARQ-ACK codebook followed by the second HARQ-ACK codebook; and transmitting the HARQ-ACK information bits in a physical uplink control channel (PUCCH).

In accordance with another aspect of the disclosure, a method performed by a base station is provided. The method includes transmitting, to a terminal, information configuring a feedback of acknowledgement/negative acknowledgement (ACK/NACK) as a separate feedback or a joint feedback; and receiving, from the terminal, hybrid automatic repeat request acknowledgement (HARQ-ACK) information bits in a physical uplink control channel (PUCCH), wherein, in case that the joint feedback is configured, the HARQ-ACK information bits are obtained by concatenating a first HARQ-ACK codebook followed by a second HARQ-ACK codebook, wherein the first HARQ-ACK codebook is associated with physical downlink shared channel (PDSCH) corresponding to a first control resource set (CORESET) with a first index value, and wherein the second HARQ-ACK codebook is associated with PDSCH corresponding to a second CORESET with a second index value.

In accordance with another aspect of the disclosure, a terminal is provided. The terminal includes a transceiver configured to transmit and receive a signal; and a controller configured to: receive information configuring a feedback of acknowledgement/negative acknowledgement (ACK/NACK) as a separate feedback or a joint feedback, generate a first hybrid automatic repeat request acknowledgement (HARQ-ACK) codebook associated with physical downlink shared channel (PDSCH) corresponding to a first control resource set (CORESET) with a first index value, generate a second HARQ-ACK codebook associated with PDSCH corresponding to a second CORESET with a second index value, obtain, in case that the joint feedback is configured, HARQ-ACK information bits by concatenating the first HARQ-ACK codebook followed by the second HARQ-ACK codebook, and transmit the HARQ-ACK information bits in a physical uplink control channel (PUCCH).

In accordance with another aspect of the disclosure, a base station is provided. The base station includes a transceiver configured to transmit and receive a signal; and a controller configured to: transmit, to a terminal, information configuring a feedback of acknowledgement/negative acknowledgement (ACK/NACK) as a separate feedback or a joint feedback, and receive, from the terminal, hybrid automatic repeat request acknowledgement (HARQ-ACK) information bits in a physical uplink control channel (PUCCH), wherein, in case that the joint feedback is configured, the HARQ-ACK information bits are obtained by concatenating a first HARQ-ACK codebook followed by a second HARQ-ACK codebook, wherein the first HARQ-ACK codebook is associated with physical downlink shared channel (PDSCH) corresponding to a first control resource set (CORESET) with a first index value, and wherein the second HARQ-ACK codebook is associated with PDSCH corresponding to a second CORESET with a second index value.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
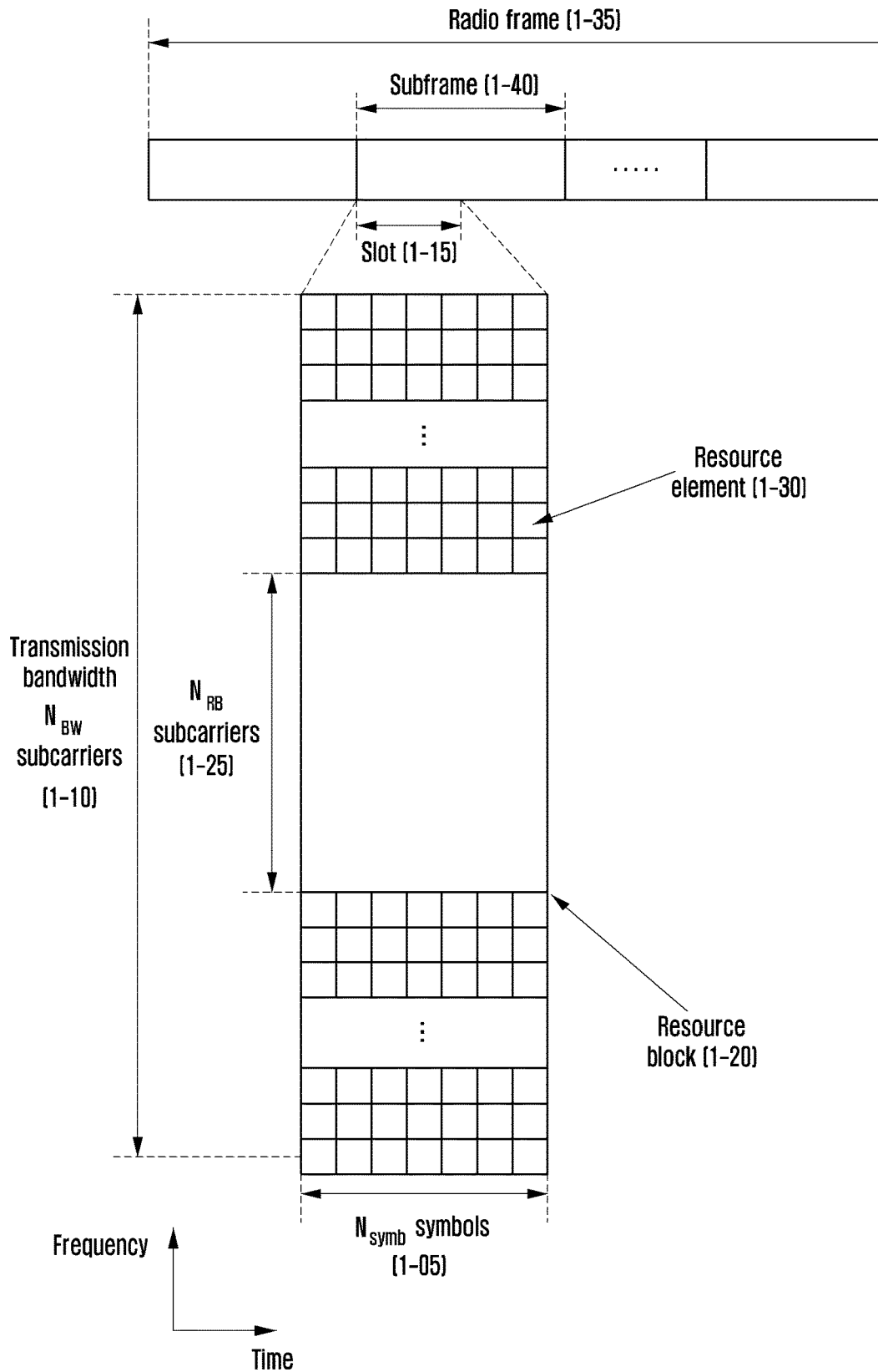
FIG. 1 illustrates a time-frequency resource structure of an LTE, LTE-Advanced (LTE-A), or NR system.

Various embodiments of the disclosure are described in detail below with reference to the accompanying drawings.

Advantages and features of the disclosure and methods of accomplishing the same may be understood more readily by reference to the following detailed descriptions of embodiments and the accompanying drawings. The disclosure may, however, be embodied in many different forms and should not be construed as being limited to the specific embodiments set forth herein, Instead, these embodiments are provided so that this disclosure will be thorough and complete and will fully convey the concept of the disclosure to those skilled in the art.

Detailed descriptions of technical specifications well-known in the art and unrelated directly to the disclosure may be omitted to avoid obscuring the subject matter of the disclosure. Basically, unnecessary description is omitted in order to make the subject matter of the disclosure clearer.

Similarly, some elements are exaggerated, omitted, or simplified in the drawings and, in practice, the elements may have sizes and/or shapes different from those shown in the drawings. Throughout the drawings, the same or equivalent parts are indicated by the same reference numbers.

Each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus implement the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instructions that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Further, the respective block diagrams may illustrate parts of modules, segments, or codes including at least one or more executable instructions for performing specific logic function(s). The functions of the blocks may be performed in a different order in several modifications. For example, two successive blocks may be performed substantially at the same time, or they may be performed in reverse order according to their functions.

According to an embodiment of the disclosure, the term "module" means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more central processing units (CPUs) in a device or a secure multimedia card.

Operation principles of the disclosure are described in detail with reference to the accompanying drawings.

Terms are defined herein in consideration of the functionality in the disclosure, and may vary according to the intention of a user or an operator, usage, etc. Therefore, definition should be made based on the overall content of the disclosure.

In the description, the term "base station (BS)" denotes an entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function. However, the disclosure is not limited by such terms.

The disclosure provides a technology for a terminal to receive broadcast information from a base station in a wireless communication system. The disclosure is applicable to intelligent services (e.g., smart homes, smart buildings, smart cities, smart cars or connected car, health care, digital education, retail, and security and safety-related services) based on the 5G communication technology and the IoT-related technology.

The terms used in the following description for indicating broadcast information, network entities, communication coverage, state transition (e.g., an event), network entities, messages, and components of a device are provided, for convenience of explanation. Accordingly, the disclosure is not limited by the terms used in the following description and may be replaced by other terms that have equivalent meanings.

In the following description, the terms and definitions given in the $3^{rd}$ generation partnership project LTE (3GPP LTE) standard are used. However, the disclosure is not limited by the terms and definitions and can be applied to other standard communication systems Mobile communication systems have evolved into high-speed, high-quality packet data communication systems (such as high speed packet access (HSPA), LTE (or evolved universal terrestrial radio access (E-UTRA)), and LTE-Advanced (LTE-A) defined in the 3GPP, high rate packet data (HRPD) defined in the $3^{rd}$ generation partnership project-2 (3GPP2), ultra mobile broadband (UMB), and 802.16e defined by the Institute of Electrical and Electronics Engineers (IEEE)) capable of providing data and multimedia services beyond the early voice-oriented services.

As a representative broadband wireless communication system, an LTE system uses orthogonal frequency division multiplexing (OFDM) in the downlink and single carrier frequency division multiple access (SC-FDMA) in the uplink. The term "uplink (UL)" denotes a radio transmission path from a terminal (or UE or MS) to a base station (gNB), and the term "downlink (DL)" denotes a radio transmission path from the base station to the terminal. Such multiple access schemes are characterized by allocating the time-frequency resources for transmitting user-specific data and control information without overlapping each other, i.e., maintaining orthogonality, in order to distinguish among user-specific data and control information.

As a next generation communication system after LTE, the 5G communication system should meet various requirements of services demanded by users and service providers. The services to be supported by 5G systems may be categorized into three categories: enhanced mobile broadband (eMBB), massive machine type communications (mMTC), and ultra-reliable and low-latency communications (URLLC).

eMBB is intended to provide exceptionally high data rate in comparison with those supported by the legacy LTE, LTE-A, and LTE-A Pro. For example, the eMBB should increase the peak data rate up to 20 Gbps in DL and 10 Gbps in UL per base station. Simultaneously, eMBB should improve the user-perceived data rate. In order to meet such requirements, signal transmission/reception technologies including a MIMO technique should be improved. The data rate requirements for 5G communication systems may be met by use of a frequency bandwidth broader than 20 MHz in the frequency band of 3 to 6 GHz or above 6 GHz instead of the current LTE band of 2 GHz.

mMTC is intended to support application services for IoT. In order to provide mMTC-based IoT application services effectively, massive access resources should be secured for terminals within a cell, terminal coverage and battery life span should be improved, and device manufacturing cost should be reduced. The IoT services should be designed to support a large number of terminals (e.g., 1,000,000 terminals/km²) within a cell in consideration of the nature of the IoT terminals that are attached to various sensors and devices for providing a communication function. By the nature of the IoT services, the mMTC terminals will likely be located in coverage holes such as a basement of a building, which requires broader coverage in comparison with other services being supported in the 5G communication system. The mMTC terminals that are characterized by their low prices and battery replacement difficulty should be designed to have very long battery lifetime.

URLLC is targeted for mission-critical cellular-based communication services such as remote robots and machinery control, industrial automation, unmanned aerial vehicles, remote health care, and emergency alert services that require ultra-low latency and ultra-high reliability. Accordingly, a URLLC service requires an ultra-low latency and ultra-high reliability. For example, a URLLC service should meet the requirements of air-interface latency lower than 0.5 ms and a packet error rate less than or equal to $10^{-5}$. In order to support the URLLC services, the 5G system should support transmit time intervals (TTI) shorter than those of other services and assign broad resources in the frequency band. Accordingly, the 5G system should support a short TTI for the URLLC, which is shorter than that for other services, and allocate broad resources in a frequency band to secure reliability of the communication link. Although the services may categorized into mMTC, URLLC, and eMBB, the disclosure is not limited by such categorization.

The above-described services to be supported by 5G systems should be provided within one framework in a mixed manner. For resource management and control efficiency, the services may be provided and controlled in a systematic manner instead of a service-specific manner.

Although the disclosed embodiments are directed to specific systems such as LTE, LTE-A, LTE Pro, or NR, those skilled in the art will understand that the embodiments can be applied to other communication systems having similar technical backgrounds and channel formats, with slight modifications, without departing from the spirit and scope of the disclosure.

FIG. 1 illustrates a time-frequency resource structure of an LTE, LTE-A, or NR system. Specifically, FIG. 1 illustrates a basic structure of a time-frequency resource region representing a radio resource region for transmitting data or control channel in an LTE, LTE-A, or NR system employing a cyclic prefix (CP) OFDM (CP-OFDM) or SC-FDMA waveform.

Referring to FIG. 1, the horizontal axis denotes time, and the vertical axis denotes frequency. The UL denotes a radio link for transmitting data or control signals from a terminal to a base station, and the DL denotes a radio link for transmitting data or control signals from the base station to the terminal.

In LTE, LTE-A, and 5G, the smallest transmission unit in the time domain is an OFDM symbol or an SC-FDMA symbol, and $N_{symb}$ symbols 1-05 form a slot 1-15. In LTE and LTE-A, 2 slots (each consisting of $N_{symb}$=7 symbols) form a subframe 1-40. In 5G, two types of slots (i.e., a slot and a mini-slot (or non-slot)) may be supported. In 5G, $N_{symb}$ may be set to 7 or 14 for a slot and one of 1, 2, 3, 4, 5, 6, and 7 for a mini-slot. In 5G, the length of a slot or a mini-slot may vary with subcarrier spacing, unlike in LTE and LTE-A where a slot has a fixed length of 0.5 ms and a subframe has a fixed length of 1.0 ms.

In LTE and LTE-A, a radio frame 1-35 is a time unit consisting of 10 subframes. In LTE and LTE-A, a subcarrier is the smallest transmission unit of 15 kHz subcarrier spacing in the frequency domain, and total NBW (1 to 10) subcarriers constitute a system transmission bandwidth. In contrast, 5G is designed with a flexible and scalable frame structure, as will be described later.

In the time-frequency domain, the basic resource unit is a resource element (RE) 1-30 indicated by an OFDM or SC-FDMA symbol index and a subcarrier index. A resource block (RB) (or physical RB (PRB)) 1-20 is defined by $Ns_{symb}$ consecutive OFDM or SC-FDMA symbols 1-05 in the time domain and $N_{RB}$ consecutive subcarriers 1-25 in the frequency domain. Therefore, one RB 1-20 consists of $N_{symb} \times N_{RB}$ REs 1-30.

In LTE and LTE-A, data mapping is performed by units of RBs, and an eNB schedules a UE by units of RB pairs in a subframe. The number of SC-FDMA or OFDM symbols ($N_{symb}$) is determined by the length of a CP that is added to each symbol to avoid inter-symbol interference (ISI). For example, $N_{symb}$ bis set to 7 for a normal CP and 6 for an extended CP. The extended CP may be preferred over the normal CP to preserve orthogonality between symbols in a system having a relatively long radio wave propagation distance.

For smooth communication between a base station and a terminal, the base station and the terminal should share information for OFDM communication such as the subcarrier spacing (SCS) and CP length.

Because the above-described LTE/LTE-A frame structure was designed in consideration of usual voice/data communication, it is restrictive for meeting the scalability requirements of 5G to support various types of services. Therefore, there is a need to design a flexible frame structure for 5G, in consideration of the scalability requirements for the various types of services.

Figure 2:
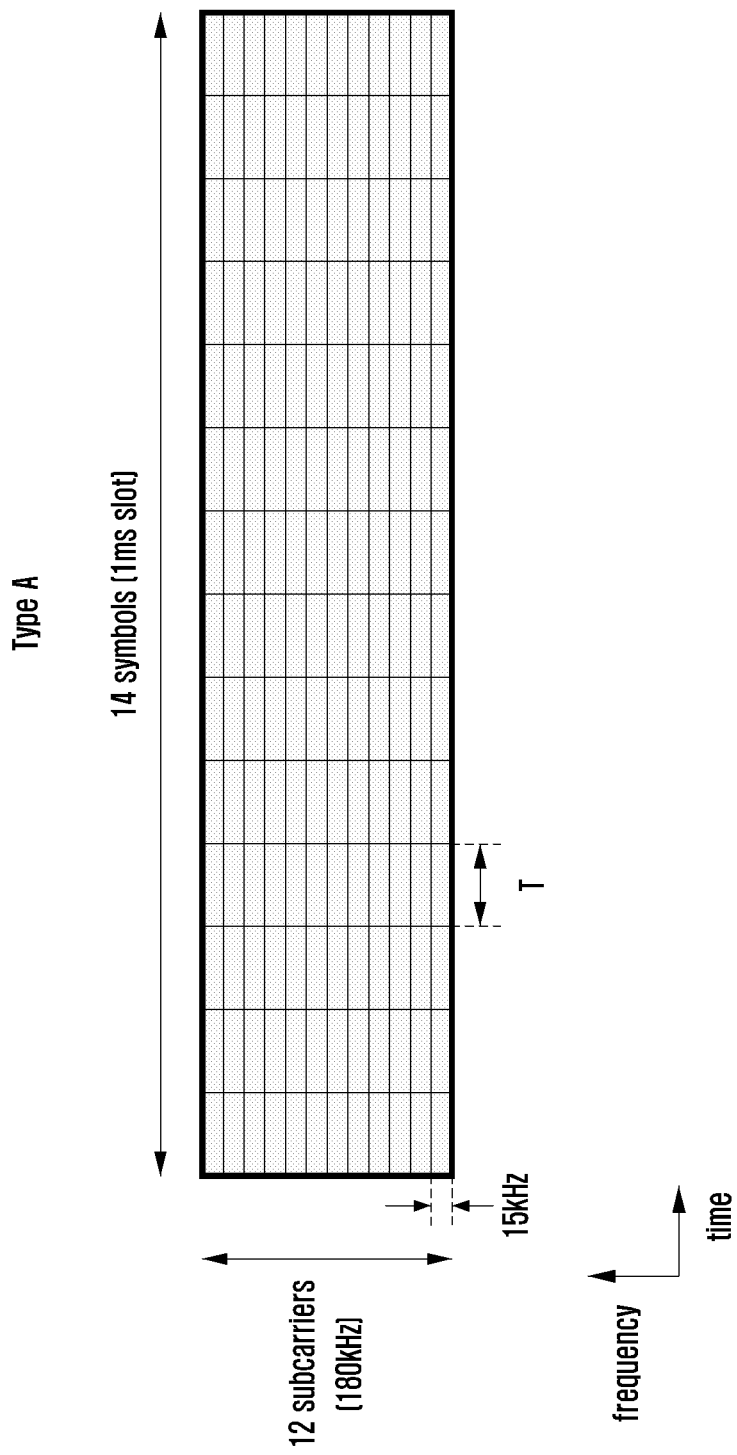
FIG. 2 illustrates a scalable frame structure according to an embodiment.
Figure 3:
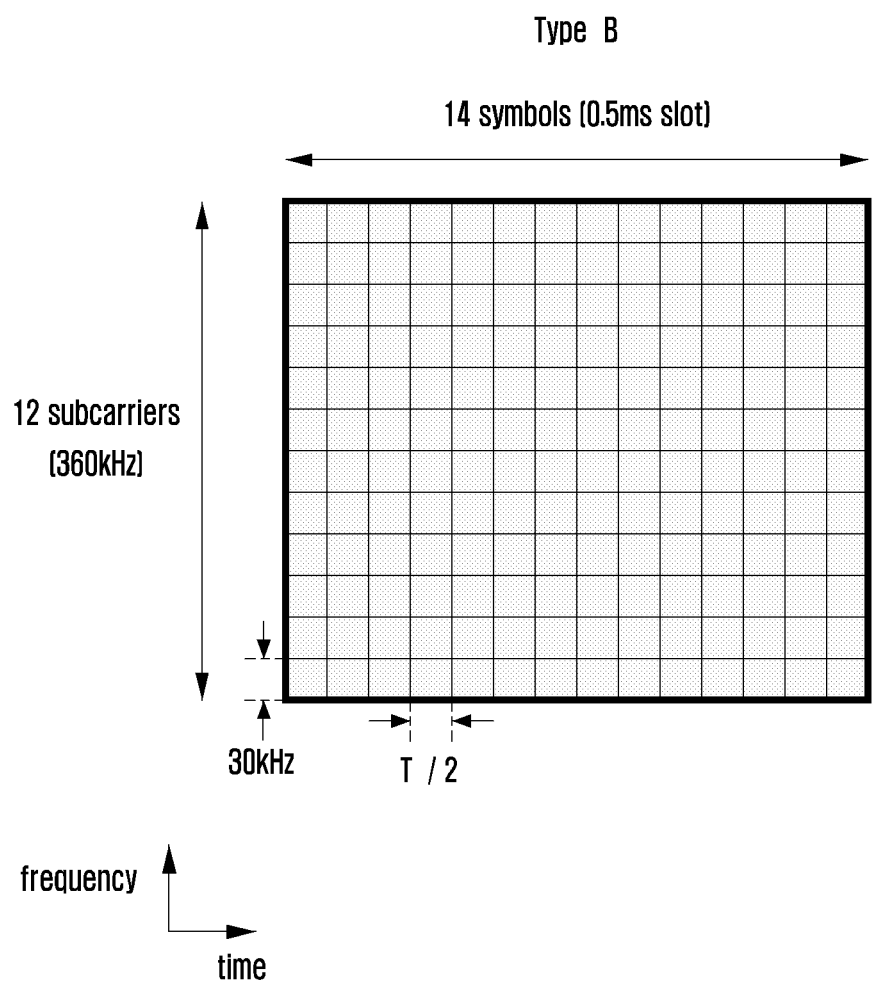
FIG. 3 illustrates a scalable frame structure according to an embodiment.
Figure 4:
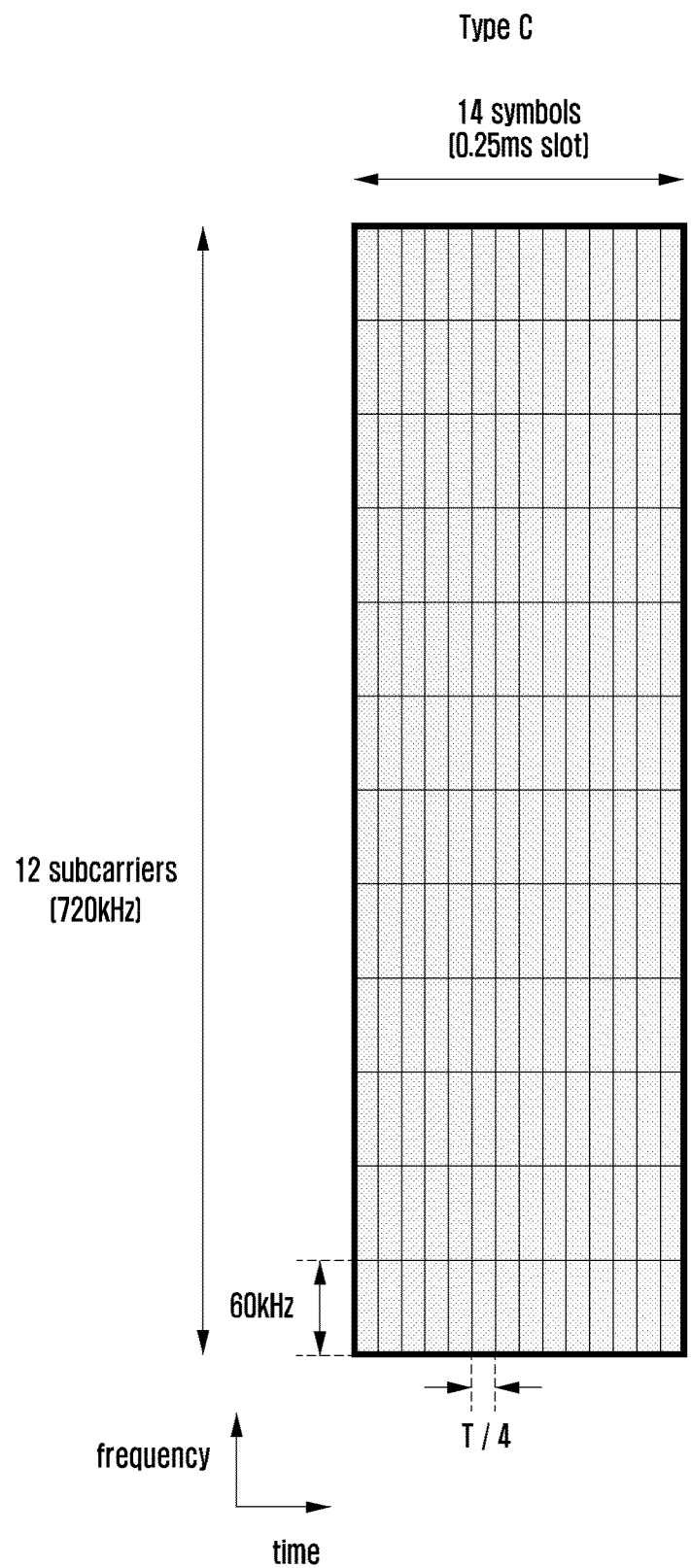
FIG. 4 illustrates a scalable frame structure according to an embodiment.

FIGS. 2 to 4 illustrate scalable frame structures according to embodiments. Specifically, FIGS. 2 to 4 illustrate differently-scaled frame structures, each along with a set of essential parameters including subcarrier spacing, CP length, and slot length.

In its initial deployment, a 5G system is likely to coexist with a legacy LTE/LTE-A system and operate in a dual mode in which it operates along with the legacy LTE/LTE-A system. This may allow the 5G system to provide enhanced services under the stability secured with the assistance of the legacy LTE/LTE-A system. Accordingly, the scalable frame structure of the 5G system should embrace the LTE/LTE-A frame structure and essential parameters therefor.

FIG. 2 illustrates a scalable frame structure according to an embodiment. Specifically, FIG. 2 illustrates an RB at a slot of a 5G frame that is identical with that of an LTE/LTE-A frame in structure and essential parameters.

Referring to FIG. 2, in a type A frame structure, a PRB consists of 14 symbols constituting a slot that spans 1 ms and 12 subcarriers, each having a 15 kHz subcarrier spacing that span 180 kHz (=12*15 kHz).

FIG. 3 illustrates a scalable frame structure according to an embodiment.

Referring to FIG. 3, a PRB in a type B frame structure consists of 14 symbols constituting a slot that spans 0.5 ms and 12 subcarriers, each having a 30 kHz subcarrier spacing that span 360 kHz (=12*30 kHz). That is, the PRB of the type B frame structure is twice the size of the PRB of the type A frame structure and is half the PRB of the type A frame structure in slot length and symbol length.

FIG. 4 illustrates a scalable frame structure according to an embodiment.

Referring to FIG. 4, a PRB in a type C frame structure consists of 14 symbols constituting a slot that spans 0.25 ms and 12 subcarriers, each having a 60 kHz subcarrier spacing that span 720 kHz (=12*60 kHz). The PRB of the type C frame structure is four times the size of the PRB of the type A frame structure and is a fourth of the PRB of the type A frame structure in slot length and symbol length.

As illustrated in FIGS. 2 to 4 and described above, the frame structures can be generalized to have an integer-multiple relationship among the subcarrier spacing, CP length, and slot length constituting the essential parameter set.

It may be possible to define a 1-ms fixed length subframe as a reference time unit independent of the type of the frame structure. In this case, a subframe consists of one slot in the type A frame structure, two slots in the type B frame structure, and four slots in the type C frame structure. However, the scalable frame structure is not limited to types A, B, or C, and the subcarrier spacing may be changed, e.g., to 120 kHz and 240 kHz.

The above-described types of frame structures may be applied to various scenarios. In view of the cell size, the type A frame structure may be better than the type B frame structure and type C frame structure in a relatively large cell because the cell size to be covered increases as the CP length increases. In view of the operation frequency band, the type C frame structure may be better than the type A frame structure and type B frame structure at a relatively high frequency because the phase noise recovery performance is improved as the subcarrier spacing increases in a high frequency band. In view of the service, the type C frame structure may be better than the type A frame structure and type B frame structure because the supportability of an ultra-low latency such as URLLC improves as the subframe length decreases.

Several types of subframe structures may also be multiplexed in one system for systematic management.

In NR, up to 250 RBs may be configured for a component carrier (CC) or serving cell. In order to overcome the excessive power consumption caused by using the entire serving cell bandwidth for a terminal to receive signals as in LTE, the base station may configure at least one BWP to the terminal, thereby making it possible for the terminal to change the reception region in the cell.

In NR, the base station may configure the initial BWP as the bandwidth of a control resource set (CORESET) #0 (or a common search space (CCS)) for the terminal via the master information block (MIB). The base station may configure the initial BWP (i.e., a first BWP) of the terminal and transmit one or more BWP configuration information items, which may be indicated via downlink control information (DCI), to the terminal, via radio resource control (RRC) signaling. The base station may transmit a BWP identifier (ID) to the terminal via the DCI to notify the terminal of the band to be used. If no DCI is received in the currently allocated BWP during a predetermined time period, the terminal may attempt to receive DCI in a default BWP.

Figure 5:
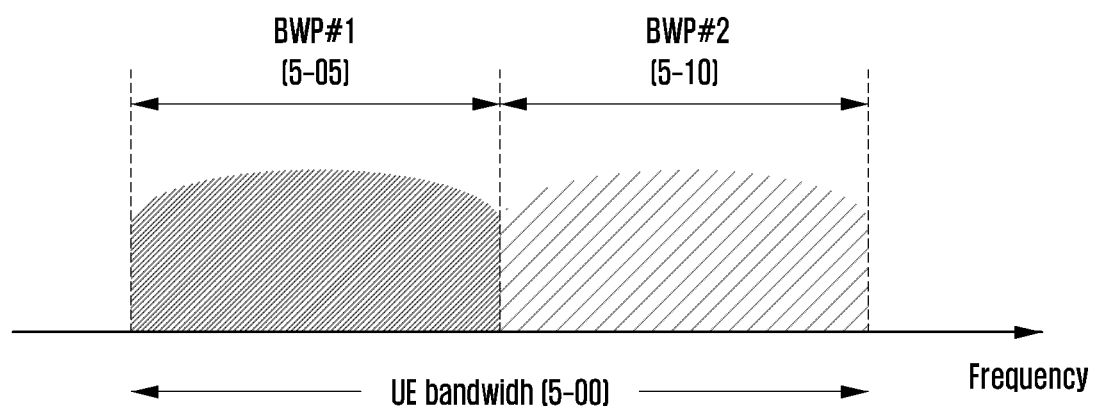
FIG. 5 illustrates a bandwidth divided into two bandwidth parts (BWPs) configured for a terminal in a 5G communication system according to an embodiment.

FIG. 5 illustrates a bandwidth divided into two BWPs configured for a terminal in a 5G communication system according to an embodiment.

Referring to FIG. 5, a UE bandwidth 5-00 is divided into two BWPs, i.e., BWP #1 5-05 and BWP #2 5-10. The base station may configure one or more BWPs for the terminal, each BWP being configured with information such as shown in Table 1 below.

TABLE 1 configuration information 1: bandwidth of BWP (number of PRBs constituting BWP)
configuration information 2: frequency location of BWP (offset from reference point such as center frequency of CC, synchronization signal, synchronization signal raster, etc.)
configuration information 3: numerology of BWP (subcarrier spacing, CP length, etc.)
others In addition to the configuration information in Table 1, various BWP-related parameters may be configured for the terminal. The base station may transmit the configuration information to the terminal via higher layer signaling, e.g., RRC signaling. Among one or more BWPs configured for the terminal, at least one BWP may be activated. Information indicating whether a configured BWP is activated may be transmitted from the base station to the terminal semi-statically via RRC signaling or dynamically via a media access control (MAC) control element (CE) (MAC CE) or DCI.

In a 5G communication system, BWPs may be configured for various purposes. For example, when the bandwidth being supported by the terminal is narrower than the system bandwidth, the terminal may be configured with a BWP. For example, a frequency location of a BWP (configuration information 1 in Table 1) may be configured for the terminal such that the terminal transmits/receives data at the corresponding frequency location.

As another example, the base station may configure multiple BWPs for the terminal in order to support different numerologies. For example, in order to support data communication using subcarrier spacings of 15 kHz and 30 kHz, the terminal may be configured with the subcarrier spacing of 15 kHz in one BWP and the subcarrier spacing of 30 kHz in another BWP. The BWPs may be frequency division-multiplexed (FDM) and, if it is necessary to transmit/receive data using a specific subcarrier spacing, a BWP in which the specific subcarrier spacing is configured.

As another example, the base station may configure BWPs, which differ in bandwidth, for the terminal in order to reduce the power consumption of the terminal. For example, if a terminal supporting a very wide bandwidth, e.g., 100 MHz, may communicate data via the corresponding bandwidth, which may cause very high power consumption. In particular, when the terminal monitors the wide bandwidth of 100 MHz for a DL control channel unnecessarily in a situation with no traffic, this is very inefficient in view of power consumption. In order to reduce power consumption of the terminal, the base station may configure a BWP with a relatively narrow bandwidth, e.g., BWP of 20 MHz, for the terminal. The terminal may monitor the BWP of 20 MHz in a situation with no traffic and, if there is traffic to be transmitted or received, communicate data via the BWP of 100 MHz according to an instruction from the base station.

Figure 6:
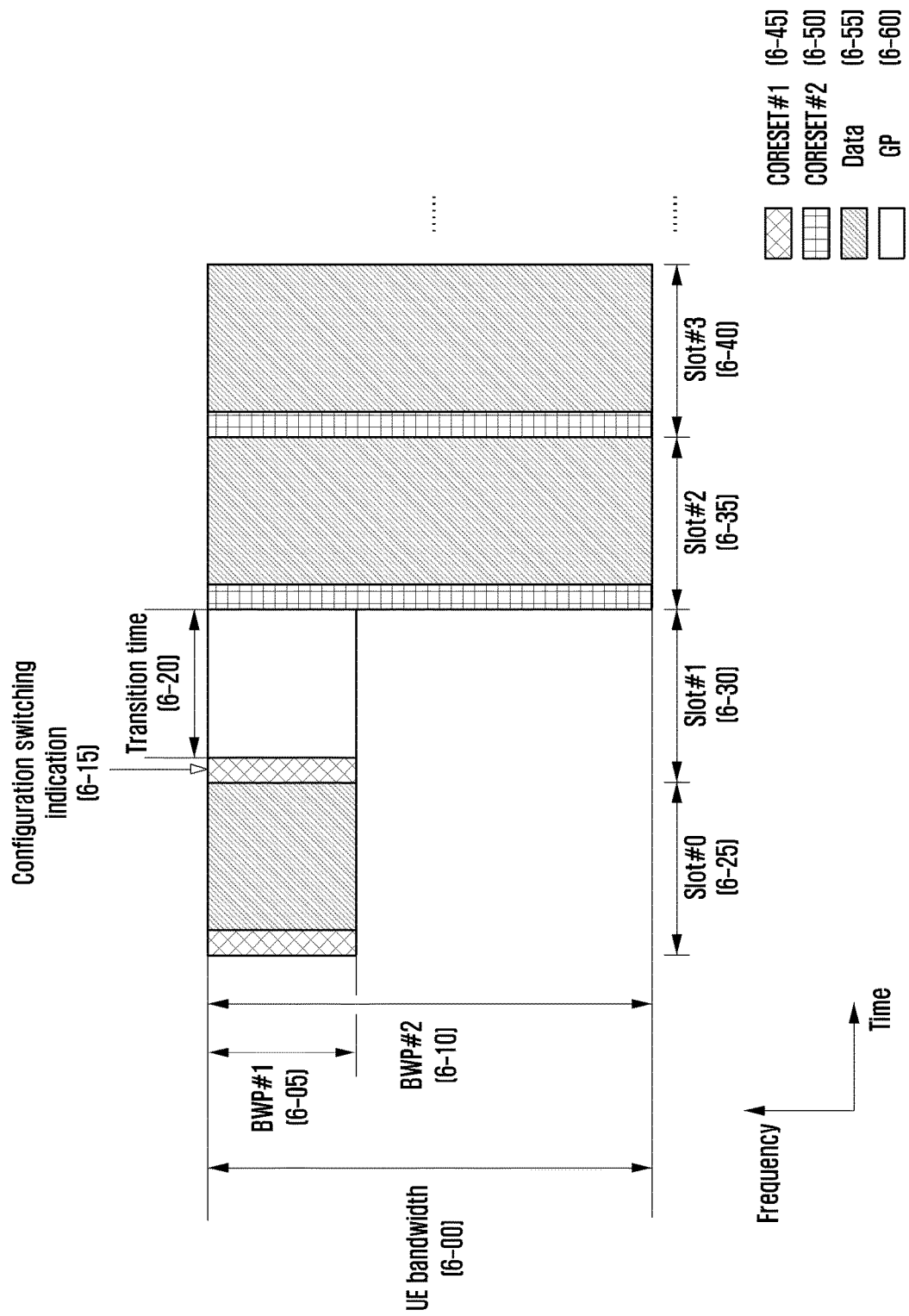
FIG. 6 illustrates a dynamic BWP configuration indication and change method according to an embodiment.

FIG. 6 illustrates a dynamic BWP configuration indication and change method according to an embodiment.

Referring to FIG. 6, as described above with reference to Table 1, a base station may configure one or more BWPs for a terminal and notify the terminal of the bandwidth, frequency location, and numerology of each BWP. The terminal may be configured with two BWPs, i.e., BWP #1 6-05 and BWP #2 6-10, in the UE bandwidth. One or more BWPs among the configured BWPs may be activated. In FIG. 6, one BWP is activated by way of example.

More specifically, in FIG. 6, among the configured BWPs, BWP #1 6-05 is activated in slot #0 6-25, such that the terminal may monitor a PDCCH in the control region #1 6-45 configured in BWP #1 6-05 and transmit/receive data 6-55 in the BWP #1 6-05. The activated BWP may determine the control region in which the terminal monitors the PDCCH, i.e., the PDCCH monitoring bandwidth.

The base station may further transmit an indicator for changing the BWP configuration to the terminal. Here, changing the BWP configuration may be understood as activating a specific BWP (e.g., switching the activated BWP from BWP A to BWP B). The base station may transmit a configuration switching indicator to the terminal in a predetermined slot, and the terminal may identify the BWP to be activated at a predetermined time based on the configuration information in the configuration switching indicator. Thereafter, the terminal may perform PDCCH monitoring in the control region being determined by the newly activated BWP from the predetermined time.

The base station may transmit, to the terminal, the configuration switching indicator for switching the activated BWP from BWP #1 6-05 to BWP #6-10 in slot #1 6-30. Upon receipt of the indicator, the terminal may activate BWP #2 6-10 based on the information included in the indicator. The BWP switching may require a transition time 6-20 that determines the time at which the activated BWP is switched. In FIG. 6, the transition time 6-20 occupies a time duration remaining after receiving the configuration switching indicator 6-15 in one slot. During the transition time 6-20, data 6-55 is not transmitted/received, which allows the BWP #2 6-10 to be activated in slot #2 6-35, in order for the terminal to transmit/receive a control channel 6-50 and data 6-55 in the corresponding BWP.

The base station may preconfigure one or more BWPs for the terminal via higher layer signaling (e.g., RRC signaling) and activate one of preconfigured BWPs by transmitting the configuration switching indicator 6-15 indicating the BWP to be activated to the terminal. For example, a log 2N-bit indicator may be used to indicate one of N preconfigured BWPs.

Table 2 shows the values of a 2-bit indicator indicative of BWP configuration information.

TABLE 2

| Indicator value | BWP configuration |
| --- | --- |
| 00 | Bandwidth configuration A configured via higher layer signaling |
| 01 | Bandwidth configuration B configured via higher layer signaling |
| 10 | Bandwidth configuration C configured via higher layer signaling |
| 11 | Bandwidth configuration D configured via higher layer signaling |

The configuration switching indicator 6-15 for switching the activated BWP may be transmitted from a base station to a terminal via MAC CE signaling or L1 signaling (e.g., common DCI, group-common DCI, and UE-specific DCI).

The time point for activating a BWP based on the configuration switching indicator 6-15 may be determined by using a predetermined value (e.g., N(>1) slots after the slot in which the configuration switching indicator is received), or may be configured via higher layer signaling from the base station to the terminal or as indicated by information included in the configuration switching indicator 6-15. Upon receipt of the configuration switching indicator 6-15, the terminal may apply the changed configuration at the time point determined through the above-described method.

NR employs a fine frequency domain resource allocation (FD-RA) method that is provided in addition to the BWP indication-based frequency domain candidate resource allocation method.

Figure 7:
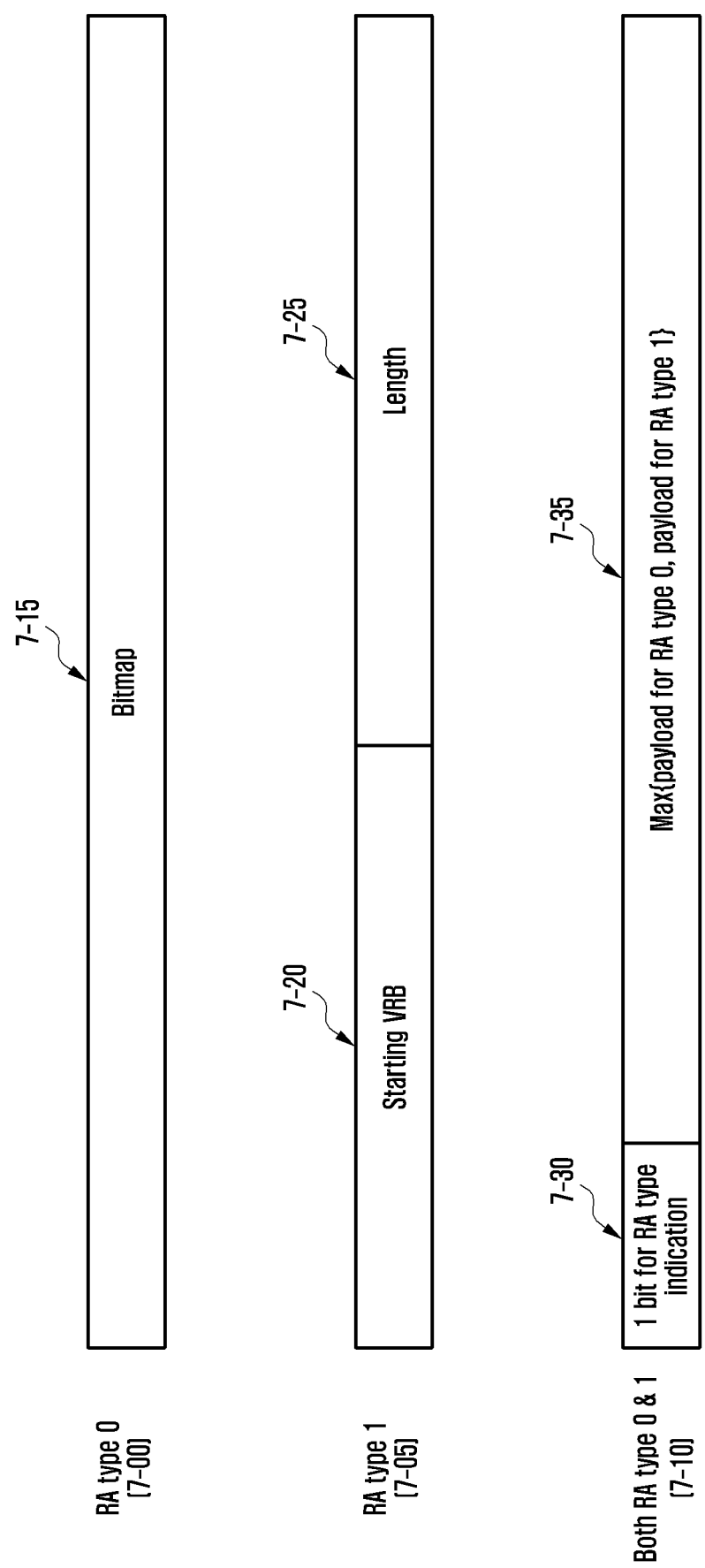
FIG. 7 illustrates physical downlink shared channel (PDSCH) frequency domain resource allocation according to an embodiment.

FIG. 7 illustrates PDSCH frequency domain resource allocation according to an embodiment. Specifically, FIG. 7 illustrates three FD-RA methods (i.e., type 0 7-00, type 1 7-05, and dynamic switching 7-10) that may be configured via higher layer signaling in NR.

Referring to FIG. 7, when the terminal is configured to use only resource type 0 via higher layer signaling, as denoted by reference number 7-00, the DCI allocating PDSCH resource to the terminal may include a bitmap 7-15 consisting of $N_{RBG}$ bits. $N_{RBG}$ denotes a number of RB groups (RBGs) determined based on the BWP size indicated by a BWP indicator and a higher layer parameter rbg-Size as shown in Table 3 below, and the RBG of which the corresponding bit is set to 1 in the bitmap is used for data transmission.

TABLE 3

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When the terminal is configured to use only resource type 1 via higher layer signaling, as denoted by reference number 7-05, the DCI allocating PDSCH resources to the terminal may include FD-RA information represented by $\lceil \log_2 (N_{RB}^{DL,BWP}(N_{RB}^{DL,BWP}+1)/2) \rceil$ bits. The base station may configure a starting VRB 7-02 and a length 7-35 of frequency domain resources being consecutively allocated from a starting VRB 7-20 with the FD-RA information.

When the terminal is configured to use both the resource type 0 and resource type 1 (i.e., dynamic switch), as denoted by reference number 7-10, the DCI allocating a PDSCH resource to the terminal may include FD-RA information represented by a bitwidth of the largest value 7-35 between the payload (i.e., bitmap 7-15) for configuring resource type 0 and the payload (i.e., starting VRB 7-20 and length 7-25) for configuring resource type 1. In this case, the most significant bit (MSB) 7-30 that is followed by the FD-RA information in the DCI is set to 0 for indicating the use of resource type 0 and to 1 for indicating the use of resource type 1.

Figure 8:
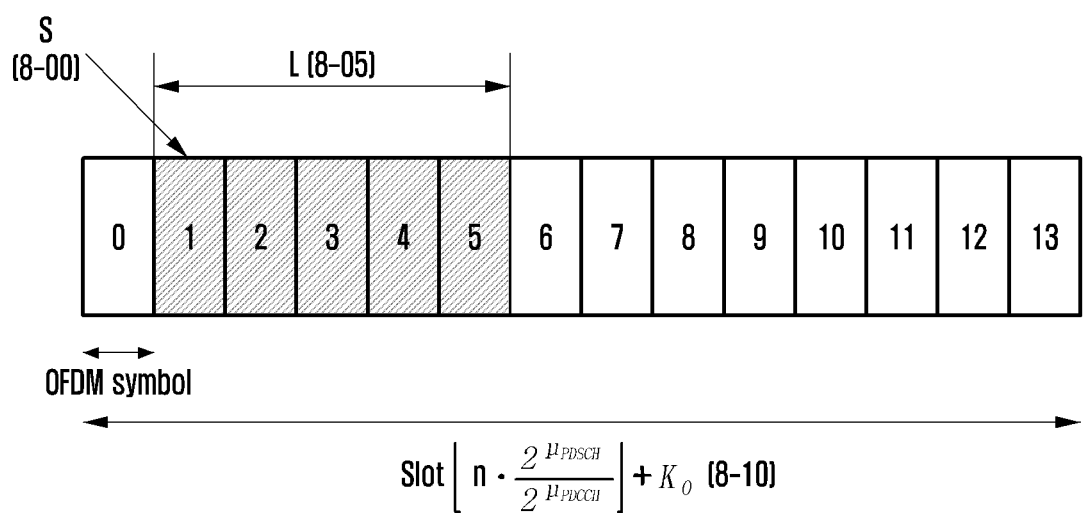
FIG. 8 illustrates PDSCH time domain resource allocation according to an embodiment.

FIG. 8 illustrates PDSCH time domain resource allocation according to an embodiment.

Referring to FIG. 8, the base station may indicate a time domain location of the PDSCH resources with an OFDM symbol starting position 8-00 and a length 8-05 in a slot 8-10, which are dynamically indicated via data and control channel subcarrier spacings ($\mu_{PDSCH}$, $\mu_{PDCCH}$), scheduling offset (K0), and DCI that are configured via higher layer signaling.

Figure 9:
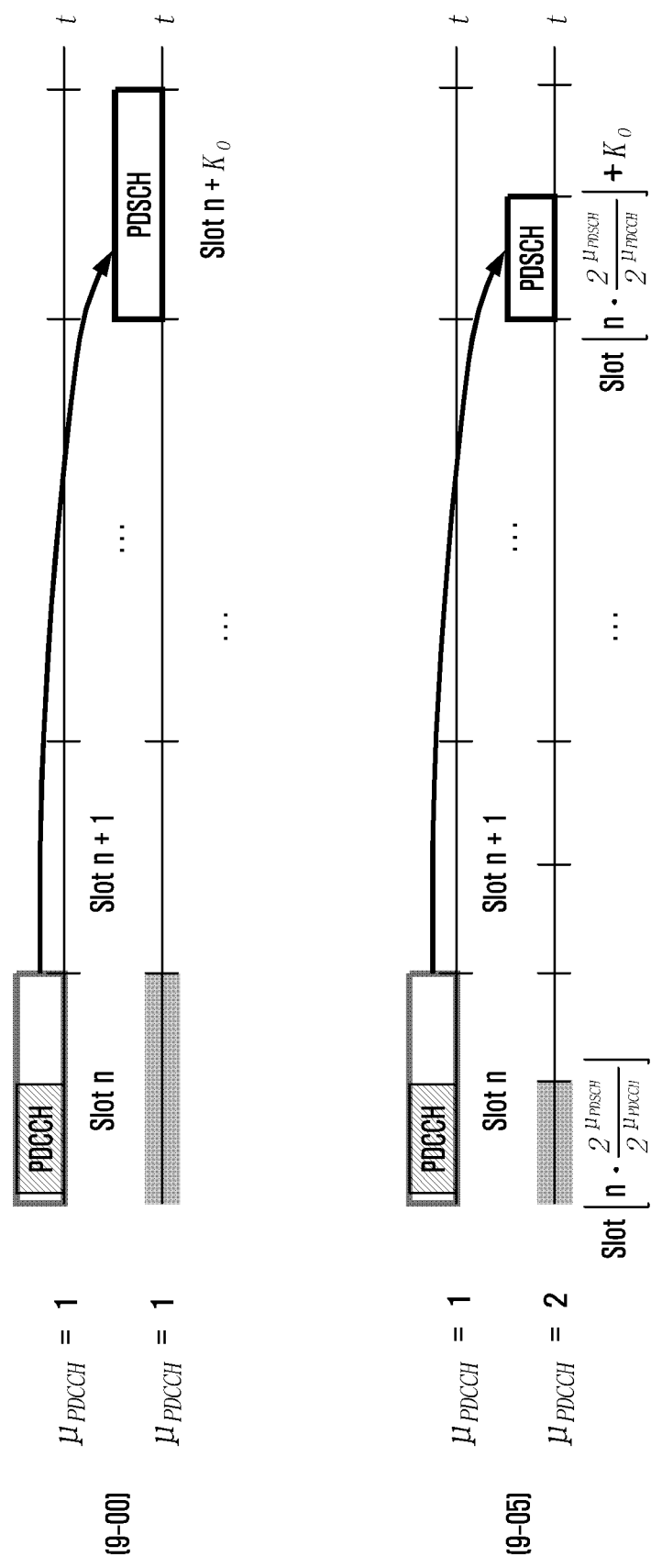
FIG. 9 illustrates time domain resource allocation based on data and control channel subcarrier spacings according to an embodiment.

FIG. 9 illustrates time domain resource allocation based on data and control channel subcarrier spacings according to an embodiment.

Referring to FIG. 9, when the subcarrier spacings of the data and control channels are equal to each other (i.e., $\mu_{PDSCH}=\mu_{PDCCH}$), as denoted by reference number 9-00, the slot numbers for the data and control information are identical with each other, which makes it possible for the base station and the terminal to recognize that the scheduling offset occurs at a predetermined slot offset $K_0$. However, when the subcarrier spacings of the data and control channels are different from each other (i.e., $\mu_{PDSCH} \neq \mu_{PDCCH}$), the slot numbers for the data and control information differ from each other, which makes it possible for the base station and the terminal to recognize that the scheduling offset occurs at a predetermined slot offset $K_0$ based on the PDCCH subcarrier spacing.

In NR, various DCI formats may be defined for different purposes as listed in Table 4, thereby improving control channel reception efficiency of the terminal.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

The base station may use DCI format 1_0 or DCI format 1_1 for PDSCH scheduling in a cell.

When being transmitted with acyclic redundancy check (CRC) scrambled by a cell radio network temporary identifier (C-RNTI), a configured scheduling RNTI (SC-RNTI), or a modulation and coding scheme cell RNTI (MCS-C-RNTI), the DCI format 1_1 includes at least the following information:

Identifier for DCI formats (1 bit): A 1-bit DCI format indicator that is always set to 1.

Frequency domain resource assignment ($\lceil \log_2(N_{RB}^{DL,BWP}(N_{RB}^{DL,BWP}+1)/2) \rceil$ bits): An indication of frequency domain resource allocation, where $N_{RB}^{DL,BMP}$ indicates the size of an active DL BWP when the DCI format 1_0 is monitored in the UE-specific search space and the size of an initial DL BWP for any other case.

Time domain resource assignment (4 bits): An indication of the time domain resource allocation.

VRB-to-PRB mapping (1 bit): An indication set to 0 for non-interleaved VRP-to-PRB mapping and 1 for interleaved VRP-to-PRB mapping.

Modulation and coding scheme (5 bits): An indication of the modulation order and coding rate for use in PDSCH transmission.

New data indicator (1 bit): An indication that is toggled to indicate whether the PDSCH is an initial transmission or a retransmission.

Redundancy version (2 bits): An indication of the redundancy version used for PDSCH transmission.

HARQ process number (4 bits): An indication of the HARQ process number used for PDSCH transmission.

DL assignment index (2 bits): A downlink assignment index (DAI) indicator.

Transmission power control (TPC) command for scheduled PUCCH (2 bits): A PUCCH power control indicator.

PUCCH resource indicator (3 bits): An indication of one of the eight resources configured via higher layer signaling.

PDSCH-to-HARQ_feedback timing indicator (3 bits): An indication of one of the eight feedback timing offsets configured via higher layer signaling.

When being transmitted along with a CRC scrambled by a C-RNTI, an SC-RNTI, or an MCS-C-RNTI, the DCI format 1_1 includes at least the following information:

Identifier for DCI formats (1 bit): A 1-bit DCI format indicator that is always set to 1.

Carrier indicator (0 or 3 bits): An indication of the CC (or cell) carrying the PDSCH scheduled by the corresponding DCI.

Bandwidth part indicator (0 or 1 or 2 bits): An indication of the BWP carrying the PDSCH scheduled by the corresponding DCI.

Frequency domain resource assignment (the frequency domain resource allocation determines payload): An indication of the frequency domain resource allocation with $N_{RBhu\ DL,BWP}$ indicating the size of the active DL BWP.

Time domain resource assignment (4 bits): An indication of the time domain resource allocation.

VRB-to-PRB mapping (0 or 1 bit): An indication of 0 bit for the non-interleaved VRP-to-PRB mapping and 1 bit for the interleaved VRP-to-PRB mapping. It is 0 bit if the frequency domain resource allocation is set to resource type 0.

PRB bundling size indicator (0 or 1 bit): An indication of 0 bit when the higher layer parameter prb-BundlingType is not configured or is set to "static" and 1 bit when the higher layer parameter prb-BundlingType is set to "dynamic".

Rate matching indicator (0 or 1 or 2 bits): An indication of the rate matching pattern.

Zero power (ZP) channel state information reference signal (CSI-RS) trigger (0 or 1 or 2 bits): An indicator triggering the aperiodic ZP CSI-RS.

For transport block 1:
  Modulation and coding scheme (5 bits): An indication of the modulation order and coding rate for use in PDSCH transmission.
  New data indicator (1 bit): An indication that is toggled to indicate whether the PDSCH is initial transmission or retransmission.
  Redundancy version (2 bits): An indication of the redundancy version used for PDSCH transmission.

For transport block 2:
  Modulation and coding scheme (5 bits): An indication of the modulation order and coding rate for use in PDSCH transmission.
  New data indicator (1 bit): An indication that is toggled to indicate whether the PDSCH is initial transmission or retransmission.
  Redundancy version (2 bits): An indication of the redundancy version used for PDSCH transmission.

HARQ process number (4 bits): An indication of the HARQ process number used for PDSCH transmission.

DL assignment index (0 or 2 or 4 bits): A DAI indicator.

TPC command for scheduled PUCCH (2 bits): A PUCCH power control indicator.

PUCCH resource indicator (3 bits): An indication of one of the eight resources configured via higher layer signaling.

PDSCH-to-HARQ_feedback timing indicator (3 bits): An indication of one of the eight feedback timing offsets configured via higher layer signaling.

Antenna port (4 or 5 or 6 bits): An indication of the demodulation reference signal (DMRS) port and code division multiplexing (CDM) group with data.

Transmission configuration indication (0 or 3 bits): A TCI indicator.

Sounding reference signal (SRS) request (2 or 3 bits): An SRS transmission request indicator.

Code block group (CBG) transmission information (0 or 2 or 4 or 6 or 8 bits): An indication of whether the code block groups are transmitted on the scheduled PDSCH.

It is 0 bit when the corresponding CBG is not transmitted and 1 bit when the corresponding CBG is transmitted.

CBG flushing out information (0 or 1 bit): An indication of whether previous CBGs are contaminated and it is 0 bit for the possibility of contamination or 1 bit for an indication of being used (i.e., combinable) if being retransmitted.

DMRS sequence initialization (0 or 1 bit): A DMRS scrambling ID selection indicator.

The terminal may be able to receive up to 4 different in sized DCIs per slot in the corresponding cell. The terminal may be able to receive up to 3 different sized C-RNTI-scrambled DCIs per slot in the corresponding cell.

Figure 10:
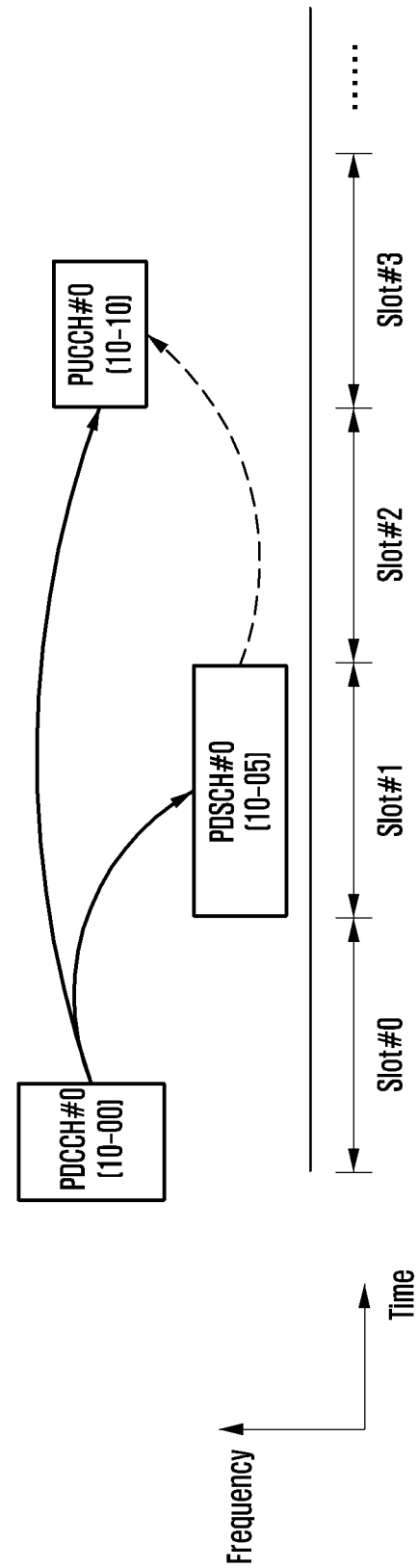
FIG. 10 illustrates PUCCH resource allocation for HARQ-ACK feedback according to an embodiment.

FIG. 10 illustrates PUCCH resource allocation for HARQ-ACK feedback according to an embodiment.

Referring to FIG. 10, a PDSCH 10-05 carrying DL data is scheduled by DCI of a PDCCH 10-00, information on the slot to which the HARQ-ACK feedback corresponding to the PDSCH is mapped, and the PUCCH 10-10 to which HARQ-ACK feedback information is mapped. A slot interval between HARQ-ACK feedbacks corresponding to the PDSCH carrying the DL data is identified by a PDSCH-to-HARQ_feedback timing indicator that indicates one of eight feedback timing offsets. The PUCCH resources including a type of PUCCH to which the HARQ-ACK feedback information is mapped, a starting symbol position, and a number of mapping symbols are identified by the PUCCH resource indicator indicating one of eight resources configured via higher layer signaling.

The terminal may bundle HARQ-ACK feedback bits, and the bundled HARQ feedback bits to be transmitted to the base station may be referred to as a HARQ-ACK codebook. The base station may configure a Type-1 HARQ-ACK codebook for the terminal to transmit the HARQ-ACK feedback bits corresponding to the PDSCH being transmitted at slot positions of predetermined timings. By using a counter DAI or a total DAT, the base station may configure a Type-2 HARQ-ACK codebook for the terminal to manage and transmit the HARQ-ACK feedback bits corresponding to the PDSCH actually transmitted.

The terminal configured with the Type-1 HARQ-ACK codebook may determine the feedback bits to be transmitted based on a table containing information on the slots to which the PDSCH is mapped, a starting symbol, and a number of symbols or a length and K1 candidate values as HARQ-ACK feedback timing information of the HARQ corresponding to the PDSCH. The table containing the information on the slots to which the PDSCH is mapped, the starting symbol, and the number of symbols or the length may be configured via higher layer signaling or set to a default table. The K1 candidate values may be set to default values, e.g., {1,2,3,4,5,6,7,8}, or configured via higher layer signaling.

A set of candidate PDSCH reception occasions in serving cell c ($M_{A,c}$) may be calculated with the steps of [pseudo-code 1] as follows.

[pseudo-code 1 start]

Step 1: Initialize j to 0, $M_{A,c}$ to an empty set, and the HARQ-ACK transmission timing index (k) to 0.

Step 2: Set R to a set of rows of a table containing the information on the slots to which PDSCH is mapped, the starting symbol, and the number of symbols or the length. If the symbols to which the PDSCH represented by each row of R is mapped is configured as an UL symbol, delete the corresponding row from R.

Step 3-1: If the terminal can receive a unicast PDSCH in a slot and if R is not the empty set, add k to the set $MA_{A,c}$.

Step 3-2: If the terminal can receive more than one PDSCH in a slot, count the maximum number of PDSCHs that can be mapped to different symbols in R, increasing j by 1 until the counting ends, and add j to $M_{A,c}$.

Step 4: Increase k by 1 to resume at step 2

[pseudo-code 1 end]

The HARQ-ACK feedback bits may be determined for $M_{A,c}$, determined based on [pseudo-code 1] through the following [pseudo-code 2] steps.

[pseudo-code 2 start]

Step 1: Initialize the HARQ-ACK reception occasion index (m) to 0 and HARQ-ACK feedback bit index j to 0.

Step 2-1: If the terminal receives an indication of neither HARQ-ACK bundling for a codeword nor CBG-based PDSCH transmission and receipt of up to 2 codewords through 1 PDSCH via higher layer signaling, increase j by 1 to configure a HARQ-ACK feedback bit per codeword.

Step 2-2: If the terminal receives an indication of HARQ-ACK bundling for a codeword and receipt of up to 2 codewords in a PDSCH via higher layer signaling, configure a per-code HARQ-ACK feedback bit through a binary AND operation.

Step 2-3: If the terminal receives an indication of CBG-based PDSCH transmission and receipt of up to 2 codewords in a PDSCH via higher layer signaling, increase j by 1 to configure HARQ-ACK feedback bits corresponding in number to CBGs.

Step 2-4: If the terminal receives an indication of CBG-based PDSCH transmission and receipt of up to 2 codeworks in a PDSCH via higher layer signaling, increase j by 1 to configure HARQ-ACK feedbacks corresponding in number to CBGs per codeword.

Step 2-5: If the terminal receives an indication of no CBG-based PDSCH transmission and an indication of receipt of up to 2 codewords in a PDSCH, set HARQ-ACK feedback bit for a codeword.

Step 3: Increase m by 1 to resume at step 2-1.

[pseudo-code 2 end]

When the terminal is configured with the Type-2 HARQ-ACK codebook, the feedback bits to be transmitted are determined based on the K1 candidate values as HARQ-ACK feedback timing information for a PDSCH and the counter DAI or total DAI for use in managing HARQ-ACK feedback bits corresponding to the PDSCH. The K1 candidate values as the HARQ-ACK feedback timing information for the PDSCH form a set of default values and values designated via higher layer signaling. For example, the default values may be a set {1,2,3,4,5,6,7,8}.

Assuming that the counter DAI (or C-DAI) of DCI format 1_0 or DCI format 1_1 scheduling PDSCH in serving cell at the PDCCH monitoring timing (m) is $V_{C-DAI,c,m}^{DL}$ and the total DAI (or T-DAI) of DCI format 1_0 or DCI format 1_1 scheduling PDSCH at the PDSCH monitoring timing (m) is $V_{T-DAI,c,m}^{DL}$ the Type-2 HARQ-ACK codebook may be configured through [pseudo-code 3] steps as follows.

[pseudo-code 3 start]

Step 1: Initialize the serving cell index (c) to 0, the PDCCH monitoring timing (m) to 0, j to 0, DAI comparison indices $V_{temp}$ and $V_{temp2}$ to 0, and HARQ-ACK feedback bit set (Vs) to an empty set.

Step 2: If the PDCCH monitoring timing (m) is ahead of the DL BWP switching for serving cell c and if the DL BWP switching is not triggered by the DCI format 1_1 of the PDCCH monitoring timing (m), exclude the serving cell from the serving cell set.

Step 3-1: When the PDSCH scheduled by the PDCCH at the PDCCH monitoring timing (m) exists in serving cell c, if $V_{C\text{-}DALc,m}^{DL}$ is less than or equal to $V_{temp}$, increase j by 1 and set $V_{C\text{-}DALc,m}^{DL}$ to $V_{temp}$. If $V_{T\text{-}DALc,m}^{DL}$ am is an empty set, set $V_{C\text{-}DALc,m}^{DL}$ to $V_{temp2}$; and if $V_{T\text{-}DALc,m}^{DL}$ is not an empty set, set $V_{T\text{-}DALc,m}^{DL}$ to $V_{temp2}$.

Step 3-2: If there is a PDSCH scheduled by a PDCCH at the PDCCH monitoring timing (m) in serving cell c, and if the terminal does not receive an indication of HARQ-ACK bundling for a codeword and receives an indication of receipt of up to 2 codewords in a PDSCH within at least one DL BWP of at least one serving cell via higher layer signaling, increase j by 1 and configure a HARQ-ACK feedback bit per codeword.

Step 3-3: If there is a PDSCH scheduled by a PDCCH at the PDCCH monitoring timing (m) in serving cell c, and if the terminal receives an indication of HARQ-ACK bundling for codewords and receipt of up to 2 codewords in a PDSCH within at least one DL BWP of at least one serving cell via higher layer signaling, configure a per-code HARQ-ACK feedback bit through a binary AND operation.

Step 3-4: If there is a PDSCH scheduled by a PDCCH at the PDCCH monitoring timing (m) in serving cell c, and the terminal receives no indication of receipt up to 2 codewords in a PDSCH, configure a HARQ-ACK feedback bit for a codeword.

Step 4: Increase c by 1 to resume at step 2.

Step 5: Increase m by 1 to resume step 2.

Step 6: If $V_{temp2}$ is less than $V_{temp}$, increase j by 1.

Step 7-1: If the terminal receives no indication of HARQ-ACK bundling for codewords and receives an indication of receipt of up to 2 codewords in a PDSCH within at least one DL BWP of at least one serving cell via higher layer signaling, set total number of HARQ-ACK feedback bits to $2\cdot(4\cdot J+V_{temp2})$ Step 7-2: If the terminal receives an indication of HARQ-ACK bundling for codewords and no indication of receipt of up to 2 codewords in a PDSCH via higher layer signaling, set the total number of HARQ-ACK feedback bits to $4\cdot J+V_{temp2}$.

Step 8: Set the HARQ-ACK feedback bits not determined at steps 3-1, 3-2, 3-3, and 3-4 to NACK.

[pseudo-code 3 end]

Based on the above-described DCI structure and HARQ-ACK codebook determination procedure, the HARQ-ACK codebook introduced in Release 15 is directed to a scenario in which a single HARQ-ACK codebook is transmitted at a specific slot to correspond to the PDSCH being transmitted at a single transmission timing, which implies the necessity of additional specification for coordinated transmission requiring transmission of multiple HARQ-ACK codebooks to correspond to the PDSCH being transmitted at multiple timings. For example, the above-described HARQ-ACK codebook determination method directed to determining a number of bits of the HARQ-ACK codebook and HARQ-ACK codebook information corresponding to one PUCCH should be extended in order to determine HARQ-ACK codebooks for two or more PUCCHs.

In accordance with an embodiment, a HARQ-ACK feedback bit design method is provided that may determine HARQ-ACK codebooks for multiple PUCCHs efficiently, which improves coordinated transmission efficiency.

The method is applicable to frequency division duplex (FDD) and time division duplex (TDD) systems.

Herein, the phrase "higher layer signaling" indicates a signal transmission method for transmission from a base station to a terminal via a physical layer DL data channel or from a terminal to a base station via a physical layer UL data channel, and may also be referred to as RRC signaling, packet data convergence protocol (PDCP) signaling, or MAC CE signaling.

The term "coordinated TRP" may be replaced by the term "coordinated panel", "coordinated beam", etc., in actual application.

Phrases, such as "for non-coherent joint transmission (NC-JT)" and "when NC-JT is applied" are used for convenience of explanation, and may be interpreted in different ways, such as "when a terminal receives simultaneously one or more PDSCHs in a BWP," "when a terminal simultaneously receives PDSCHs based on two or more TCI indications in a BWP," and "when a PDSCH being received by a terminal is associated with one or more DMRS port groups" according to the situation.

A terminal may receive information from multiple TRPs having various channel qualities in a coordinated transmission environment and, among them, the TRP having the best channel quality may be designated as a serving TRP for providing important control information, while the others are designated as coordinating TRPs.

Embodiment 1: Type-1 HARQ-ACK Codebook Payload Reduction for NC-JT

A 5G wireless communication system may provide diverse services including ultra-low latency and high connection density services and high data rate services. In a wireless communication network with multiple cells, TRPs, or beams, the coordinated transmission of the cells, TRPs and/or beams may be used to meet the various service requirements in order to increase the strength of signals being received by the terminal and control the inter-cell, inter-TRP, and/or inter-beam interference efficiently.

Joint transmission (JT) is a technology for coordinated transmission, and is capable of increasing the received signal strength at the terminal using different cells, TRPs, and/or beams. Because the channel characteristics between the terminal and the cells, TRPs, and/or beams are different from each other, different precoding, MCS, and resource allocation schemes are applied to the links between the terminal and the cells, TRPs, and/or beams. For NC-JT supporting non-coherent precoding among cell, TRPs, and/ or beams, DL transmission information should be configured per cell, TRP, and/or beam.

Figure 11:
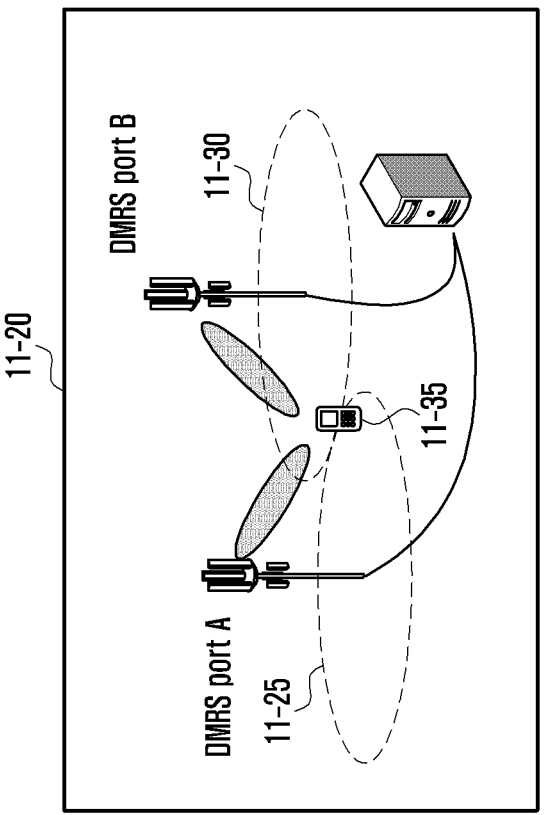
FIG. 11 illustrates a coordinated transmission antenna configuration according to an embodiment.
Figure 11:
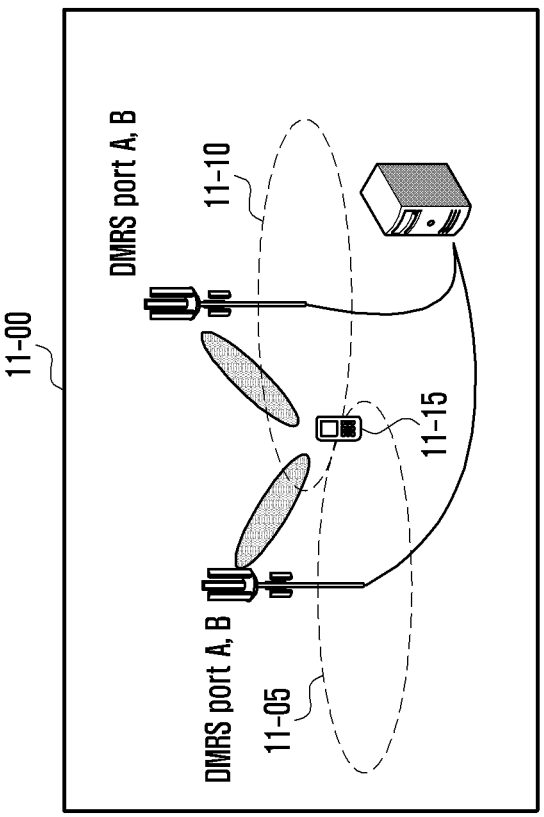

FIG. 11 illustrates a coordinated transmission antenna configuration according to an embodiment. Specifically, FIG. 11 illustrates situations for allocating radio resources per TRP according to the JT scheme and condition.

Referring to FIG. 11, situation 11-00 uses a coherent JT (C-JT) supporting coherent precoding between cells, TRPs, and/or beams. In C-JT, TRP A 11-05 and TRP B 11-10 transmit the same data (i.e., a PDSCH), and multiple TRPs perform joint precoding. As such, the TRP A 11-05 and TRP B 11-10 may transmit the same DMRS ports (e.g., both the two TRPs transmit DMRS ports A and B) for use by the terminal 11-15 in receiving the same PDSCH. In this case, the terminal 11-15 may receive DCI for receiving a PDSCH being demodulated by the DMRS ports A and B.

In situation 11-20, NC-JT is used. In NC-JT, different PDSCHs are transmitted in the cells/TRPs, and/or beams, and precoding may be applied per PDSCH. AS such, TRP A 11-25 and TRP B 30 may transmit different DMRS ports (e.g., DMRS port A at TRP A and DMRS port B at TRP B) for use by the terminal 11-35 in receiving different PDSCHs. In this case, the terminal 11-35 may receive two types of DCI for receiving PDSCH A being modulated by DMRS port A and PDSCH B being modulated by DMRS port B.

Figure 12:
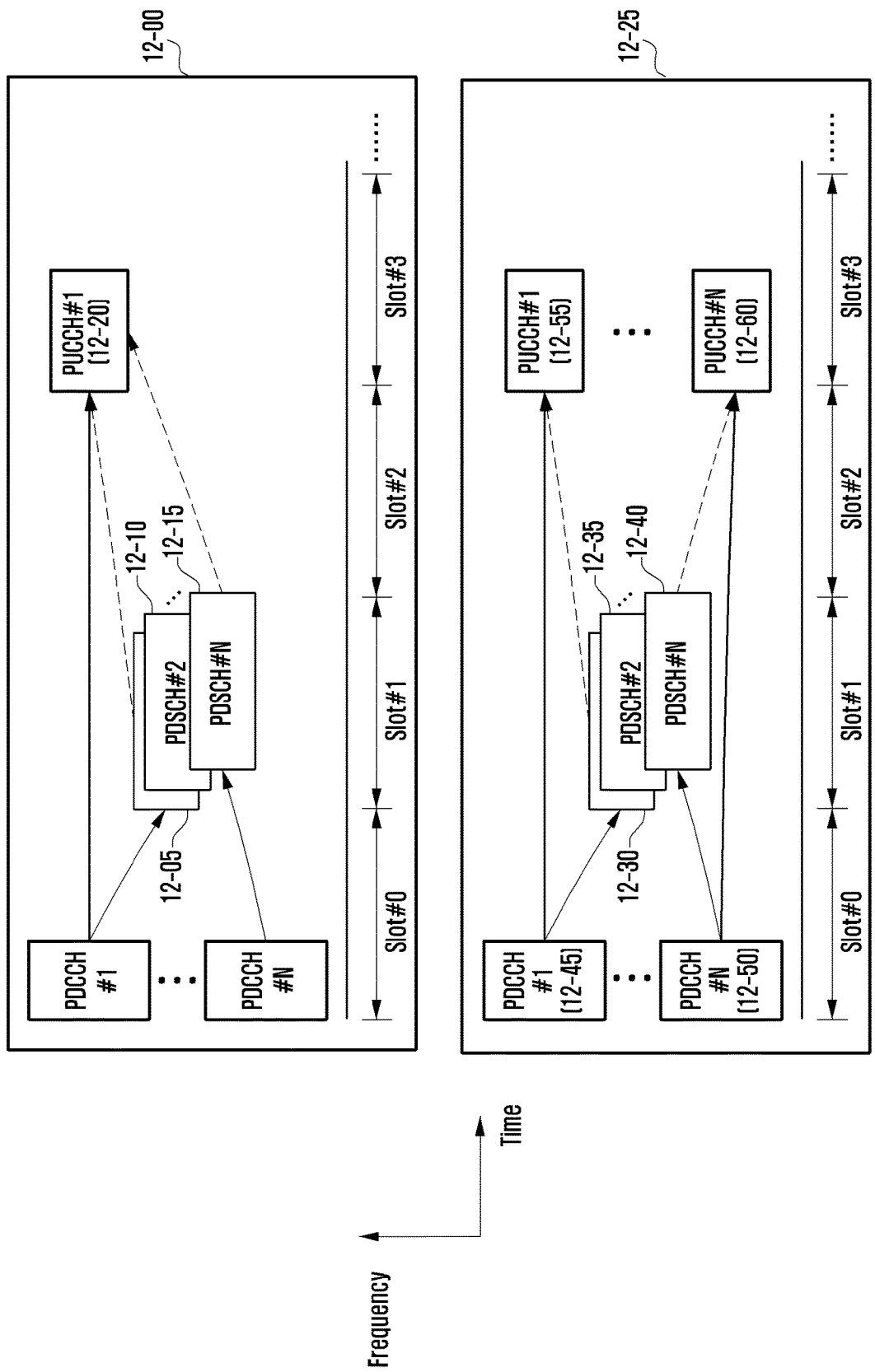
FIG. 12 illustrates PDSCH and PUCCH resource allocations for coordinated transmission and single PUCCH and multiple PUCCHs carrying a HARQ-ACK codebook corresponding to PDSCHs according to an embodiment.

FIG. 12 illustrates PDSCH and PUCCH resource allocations for coordinated transmission and single PUCCH and multiple PUCCHs carrying a HARQ-ACK codebook corresponding to PDSCHs according to an embodiment.

Referring to FIG. 12, when applying the NC-JT, the HARQ-ACK codebooks corresponding to different PDSCHs transmitted in the respective cells, TRPs, and/or beams are transmitted to the base station through a single PUCCH or multiple PUCCHs.

When transmitting the HARQ-ACK codebook through a single PUCCH as denoted by reference number 12-00, the terminal may generate a single HARQ-ACK codebook with the HARQ-ACK feedback bits corresponding to different PDSCHs 12-05, 12-10, and 12-15 transmitted in different cells, TRPs, and/or beams to a TRP, e.g., the serving TRP for use by the terminal in receiving a single PDSCH, and transmit the HARQ-ACK codebook through the single PUCCH 12-20.

When transmitting the HARQ-ACK codebook through multiple PUCCHs as denoted by reference number 12-25, the terminal may configure HARQ-ACK codebooks corresponding to different PDSCHs 12-30, 12-35, and 12-40 transmitted in the different cells, TRPs, and/or beams and transmit the individual HARQ-ACK codebooks to the TRPs that have transmitted the respective PDSCHs, via PUCCHs 12-55 and 12-60 mapped on the PUCCH resources indicated by DCIs carried in the PDCCHs 12-45 and 12-50. The terminal may also configure a HARQ-ACK codebook with HARQ-ACK feedback bits corresponding to the PDSCHs 12-30, 12-35, and 12-40 transmitted in the different cells, TRPs, and/or beams and transmit the HARQ-ACK codebook to the TRPs, which have transmitted the PDSCHs, via multiple PDCCHs 12-55 and 12-60 mapped to the PUCCH resources indicated by the DCIs 12-45 and 12-50.

When the terminal configures a HARQ-ACK codebook with the HARQ-ACK feedback bits corresponding to the PDSCHs transmitted in different cells, TRPs, and/or beams and transmits the HARQ-ACK codebook via a single PUCCH, the increased number of bits constituting the HARQ-ACK codebook may cause PUCCH coverage reduction, degrading reception performance at the base station. Particularly, when the terminal receives an indication of Type-1 HARQ-ACK codebook configuration, the terminal transmits the HARQ-ACK feedback bits to the largest PDSCH in a slot at a predetermined timing, regardless of whether or not there is an actual PDSCH transmission, linearly increasing the number of HARQ-ACK codebook bits in proportion of the number of TRPs.

The embodiments described below are directed to methods for reducing and indicating a number of HARQ-ACK codebook bits when the terminal receives an indication of Type-1 HARQ-ACK codebook configuration and the NC-JT is applied.

Embodiment 1-1: Method for Supporting Only PDSCH Mapping Type A

In NC-JT, only the PDSCH mapping type A is supported for the PDSCHs transmitted in different cells, TRPs, and/or beams, which is notified to the terminal via higher layer configuration. To support only the PDSCH mapping type A, a number of PDSCHs allowed to be scheduled within the confines of no overlapped symbols per slot is limited to 1. Accordingly, when the terminal determines a Type-1 HARQ-ACK codebook feedback bitwidth, the maximum number of PDSCHs allowed to be transmitted via each TRP at a slot position for the NC-JT may be always calculated as 1. This reduces the HARQ-ACK feedback bitwidth of the slot for NC-JT.

The HARQ-ACK feedback bits may be determined as described below. For example, the above-described [pseudo-code 1] may be replaced by [pseudo-code 4]. A set of candidate PDSCH reception occasions in serving cell c ($M_{A,c}$) may be calculated with the steps of [pseudo-code 4] as follows.

[pseudo-code 4 start]

Step 1: Initialize j to 0, $M_{A,c}$ to an empty set, and the HARQ-ACK transmission timing index (k) to 0.

Step 2-1: Set R to a set of rows of a table containing information on the slots to which PDSCH is mapped, starting symbol, and number of symbols or length. If the symbols to which the PDSCH represented by each row of R is mapped is configured as an UL symbol, delete the corresponding row from R.

Step 2-2: When NC-JT is applied to a slot corresponding to k and only the PDSCH mapping type A is supported while the JC-JT is applied according to higher layer configuration, if each row of R indicates PDSCH mapping type B, delete the corresponding row from R.

Step 3-1: If the terminal can receive a unicast PDSCH in slot and if R is not the empty set, add k to the set $M_{A,c}$.

Step 3-2: If the terminal can receive more than one PDSCH in a slot, count the maximum number of PDSCHs that can be mapped to different symbols in R, increase j by 1 up to the corresponding number, and add j to $M_{A,c}$.

Step 4: Increase by to resume at step 2.

[pseudo-code 4 end]

Table 5 below provides an example of information on slots to which a PDSCH is mapping, a starting symbol, and a number of symbols or a length.

TABLE 5

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

According to Table 5 up to 3PDSCHs can be mapped to one slot when supporting both the PDSCH mapping types A and B, and up to 1 PDSCH can be mapped to one slot when supporting only the PDSCH mapping type A.

Although the method disclosed in Embodiment 1-1 is advantageous in terms of reducing the HARQ-ACK feedback bitwidth in the slot for NC-JT, it may be disadvantageous in terms of decreasing a degree of freedom of PDSCH mapping because of the restricted symbol positions and number of symbols assignable within a slot as a result of the confinement of the PDSCH mapping type for the NC-JT. The embodiment described below is directed to a method for reducing the Type-1 HARQ-ACK codebook bitwidth without compromising the degree of freedom of PDSCH mapping.

Embodiment 1-2: Method for Supporting HARQ-ACK Slot-Level Bundling

Each TRP may not schedule two or more PDSCHs in one slot and may transmit an indication of Type-1 HARQ-ACK codebook configuration in order for the terminal to generate a Type-1 HARQ-ACK codebook with a bit width reduced by bundling the HARQ-ACK feedback bits corresponding to the PDSCH being transmitted in slots for NC-JT. When the indication of Type-1 HARQ-ACK codebook configuration is received the HARQ-ACK bitwidth is determined by the maximum number of PDSCHs that can be transmitted within one slot according to the table containing the information on the slot to which PDSCH is mapped, the start symbol, and the number of symbols or length, and the terminal may set the bit representing the HARQ-ACK information corresponding to the PDSCH occasion to NACK. If an indication of a binary OR operation for HARQ-ACK information confined within a slot is received, the terminal may set the HARQ-ACK information to ACK when there is a PDSCH received from a TRP within the corresponding slot and NACK when the PDSCH is not received. Because the HARQ-ACK bitwidth is determined by the maximum number of PDSCHs according to the table containing the information on the slot to which PDSCH is mapped, the starting symbol, and the number of symbol or length per TRP when each TRP only schedules one PDSCH within a slot, it is possible to avoid unnecessary NACK information transmissions and reduce the number of bits of the Type-1 HARQ-ACK codebook. Although the method described in Embodiment 1-2 is advantageous in terms of not compromising the degree of freedom of the PDSCH mapping because of no restriction on a PDSCH mapping type, it is disadvantageous in terms of limiting the number of PDSCHs that can be mapped within one slot per TRP to 1 as in Embodiment 1-1.

HARQ-ACK feedback bits may be determined as follows. For example, the above-described [pseudo-code 1] may be replaced by [pseudo-code 5]. A set of candidate PDSCH reception occasions in a serving cell c ($M_{A,c}$) may be calculated using steps of [pseudo-code 5] as follows.

[pseudo-code 5 start]
Step 1: Initialize j to 0, $M_{A,c}$ to an empty set, and the HARQ-ACK transmission timing index (k) to 0.
Step 2: Set R to a set of rows of a table containing the information on the slots to which PDSCH is mapped, the starting symbol, and the number of symbols or length. If the symbols to which the PDSCH represented by each row of R is mapped is configured as a UL symbol, delete the corresponding row from R.
Step 3-1: If the terminal can receive a unicast PDSCH in a slot and if R is not the empty set, add k to the set $M_{A,c}$.
Step 3-2: If the terminal can receive more than one PDSCH within a slot and if the corresponding slot is not for NC-JT, count the maximum number of PDSCHs that can be mapped to different symbols in R, increasing j by 1 until the counting ends, and add j to $M_{A,c}$.
Step 3-3: If the terminal can receive more than one PDSCH within a slot, if the corresponding slot is for NC-JT, and if no indication of slot-level bundling configuration for the slots for NC-JT is received via higher layer signaling, count the maximum number of PDSCHs that can be mapped to different symbols in R, increasing j by 1 until the counting ends, and add j to $M_{A,c}$.
Step 3-4: If the terminal can receive more than one PDSCH within a slot, if the corresponding slot is for NC-JT, and if an indication of slot-level bundling configuration for the slots for NC-JT is received via higher layer signaling, add j to $M_{A,c}$ and increase j by 1.
Step 4: Increase k by 1 to resume at step 2.
[pseudo-code 5 end]

When the slot-level bundling is configured for slots for NC-JT via higher layer signaling in [pseudo-code 5], only one j is added to $M_{A,c}$ for the slots for NC-JT, which produces the same result as that obtained by applying the binary OR operation to the HARQ-ACK information corresponding to the PDSCHs that can be transmitted by one TRP in the corresponding slots.

This embodiment may be extended such that the HARQ-ACK slot-level bundling may be or may not be configured for each of one TRP, e.g., a serving TRP for use by the terminal in receiving a single PDSCH, and the TRPs excluding the serving TRP. For example, when configuring whether to apply the HARQ-ACK slot-level bundling for all TRPs via higher layer signal and transmitting an indication of the HARQ-ACK slot-level bundling for all TRPs, whether to apply HARQ-ACK slot-level bundling for the serving TRP may be indicated via separate higher layer signaling.

Figure 13:
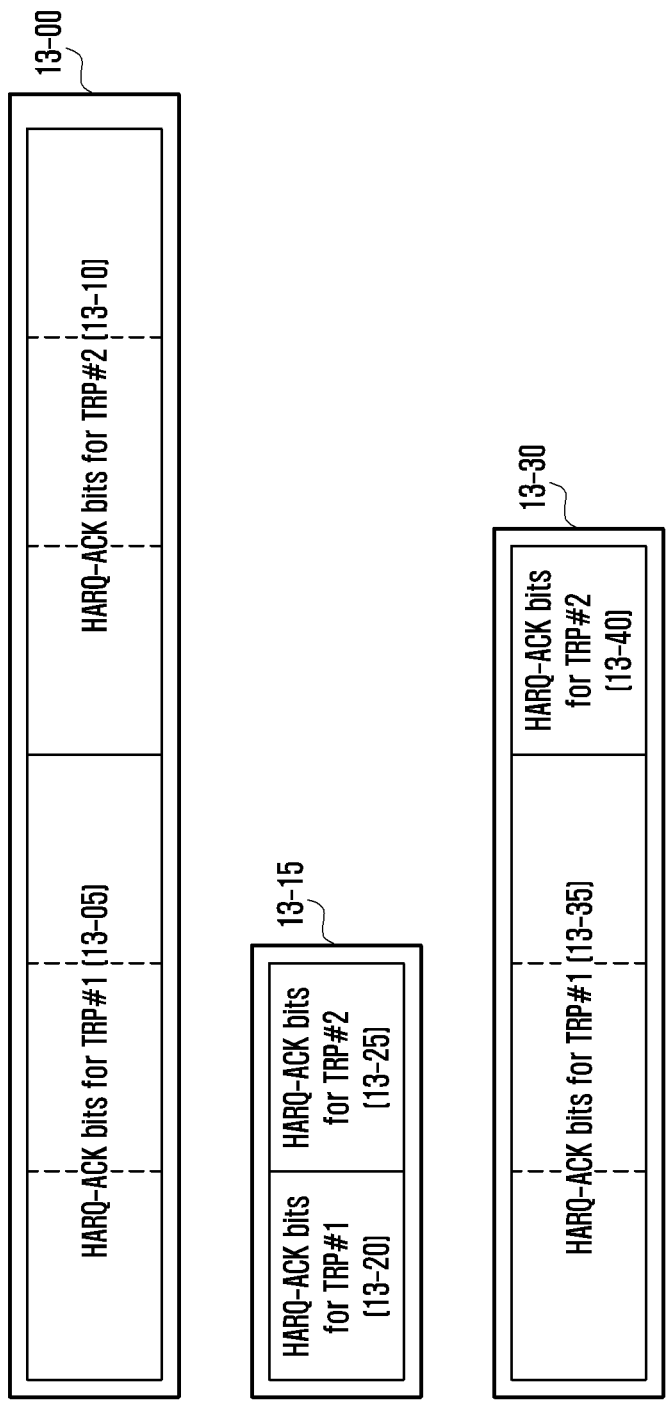
FIG. 13 illustrates Type-1 HARQ-ACK codebook structures that are different depending on whether HARQ-ACK slot-level bundling is applied according to an embodiment.

FIG. 13 illustrates Type-1 HARQ-ACK codebook structures that differ depending on whether HARQ-ACK slot-level bundling is applied according to an embodiment. Specifically, FIG. 13 illustrates three exemplary Type-1 HARQ-ACK codebook structures of when configuration on whether HARQ-ACK slot-level bundling for all TRPs and configuration on whether HARQ-ACK slot-level bundling for the serving TRP are indicated independently.

Referring to FIG. 13, structure #1 13-00 shows a Type-1 HARQ-ACK codebook structure for use when the HARQ-ACK slot-level bundling for all TRPs is not indicated. In this case, the HARQ-ACK feedback bits 13-05 and 13-10, which are equal in number to the total PDSCHs that can be transmitted by individual TRPs within a slot, being determined according to the table containing the information on the slot to which PDSCH is mapped, the start symbol, and the number of symbols or length are bundled into the Type-1 HARQ-ACK codebook structure. Although the number of PDSCHs that can be transmitted by each TRP within one slot is not limited, this structure has a drawback in that the number of HARQ-ACK feedback bits linearly increases according to the number of TRPs.

Structure #2 13-15 shows a Type-1 HARQ-ACK codebook structure for use when both the HARQ-ACK slot-level bundling for all TRPs and the HARQ-ACK slot-level bundling for the serving TRP are indicated. In this case, the number of PDSCHs that can be transmitted by each TRP within a slot is limited to 1, and the HARQ-ACK feedback bits 13-20 and 13-25 are determined based on whether a PDSCH is transmitted in the corresponding slot. Although the number of PDSCHs that can be transmitted within a slot is limited to 1 for all TRPs, the number of HARQ-ACK feedback bits per TRP in a slot decreases to 1, reducing the total number of HARQ-ACK feedback bits.

Structure #3 13-30 shows a Type-1 HARQ-ACK codebook structure for use when the HARQ-ACK slot-level bundling for all TRPs is indicated and the HARQ-ACK slot-level bundling for the serving cell is not indicated. In this case, the HARQ-ACK feedback bits 13-35 for the serving TRP, which are equal in number to the PDSCHs that can be transmitted by the serving TRP within a slot, being determined according to the table containing the information on the slot to which PDSCH is mapped, the start symbol, and the number of symbols or length, and the HARQ-ACK feedback bit 13-40 for the coordinating TRP are bundled into the Type-1 HARQ-ACK codebook structure. In this case, the number of PDSCHs that can be transmitted by the serving TRP within a slot is not limited, and the number of PDSCHs that can be transmitted by the coordinating PRB is limited to 1. This structure is advantageous in terms of reducing the number of HARQ-ACK feedback bits for the cooperating TRPs without any limit in scheduling PDSCHs for the serving TRP.

Embodiment 1-3: Method for Limiting Number of HARQ-ACK Feedback Bits Per Slot Embodiment 1-3 provides a method for limiting the number of HARQ-ACK feedback bits designated per slot and limiting the number of PDSCHs that can be transmitted by the serving or a coordinating TRP within a slot to 1. This method is advantageous in terms of making it possible to indicate a maximum number of PDSCHs that can be transmitted by each TRP per slot within the HARQ feedback bitwidth limited by the base station. The HARQ-ACK feedback bitwidth limited by the base station may be determined according to the PUCCH coverage for transmitting the HARQ-ACK codebook.

through a PDSCH is received via higher layer signaling, the number of HARQ-ACK feedback bits corresponding to a slot may be calculated by N*maxNrofPDCCHs*2. When the indication of a configuration for HARQ-ACK bundling per slot is received or the indication of a configuration for transmission of up to 2 codewords through a PDSCH is not received via higher layer signaling, the number of HARQ-ACK feedback bits may also be calculated by N*maxNrofPDCCHs. This assumes that the maximum number of PDSCHs that can be mapped in one slot per TRP is maxNrofPDCCHs and the maximum number of PDSCHs that can be transmitted by each TRP in one slot may be limited to 1 by limiting the number of HARQ-ACK feedback bits that can be transmitted within a slot to be less than maxNrofPDCCHs.

For example, when the indication of a configuration for HARQ-ACK bundling per slot is received or the indication of a configuration for transmission of up to 2 codewords through a PDSCH is not received, if the number of HARQ-ACK feedback bits that can be transmitted in one slot N*maxNrofPDCCHs is greater than a limit value of the number of HARQ-ACK feedback bits designated per slot, the number of HARQ-ACK feedback bits designated per slot may be reduced to maxNrofPDCCHs+N−1 by limiting the maximum number of PDSCHs that can be transmitted per coordinating TRP in a slot, excluding the serving TRP, to 1. If the number of HARQ-ACK feedback bits designated per slot that has been reduced to maxNrofPDCCHs+N−1 is greater than the limit value of the number of HARQ-ACK feedback bits designated per slot, the number of HARQ-ACK feedback bits designated per slot is reduced to N (e.g., N is a positive integer) by limiting the maximum number of PDSCHs that can be transmitted by the serving TRP in a slot to 1.

Table 6 provides an example of information on whether to limit the maximum number of PDSCHs that can be scheduled per TRP according to a number of HARQ-ACK feedback bits when the indication of a configuration for HARQ-ACK bundling per codeword is not received and the indication of a configuration for transmission of up to 2 codewords through a PDSCH is received via higher layer signaling, assuming that a limit value of the number of HARQ-ACK feedback bits designated per slot is K.

TABLE 6

| Condition for limit value K of number of HARQ-ACK feedback bits | Maximum number of PDSCHs of serving TRP per slot | Maximum number of PDSCHs per coordinating TRP per slot | Number of HARQ-ACK feedbacks designated per slot |
| --- | --- | --- | --- |
| 2 * N * maxNrofPDCCHs ≤ K | maxNrofPDCCHs | maxNrofPDCCHs | 2 * N * maxNrofPDCCHs |
| 2*(maxNrofPDCCHs + N − 1) ≤ K ≤ 2 * N * maxNrofPDCCHs | maxNrofPDCCHs | 1 | 2*(maxNrofPDCCHs + N − 1) |
| K ≤ 2*(maxNrofPDCCHs + N − 1) | 1 | 1 | 2 * N |

Assuming that the number of TRPs transmitting PDSCHs during a slot in the serving cell is N, the maximum number of PDSCHs that can be transmitted with a slot maxNrofPDCCHs may be determined according to the table containing the information on the slot to which PDSCHs are mapped, the starting symbol, and the number of symbols or length. When an indication of a configuration for HARQ-ACK bundling per slot is not received and an indication of a configuration for transmission of up to 2 codewords Table 7 provides an example of information on whether to limit the maximum number of PDSCHs that can be scheduled per TRP according to A number of HARQ-ACK feedback bits when the indication of a configuration for HARQ-ACK bundling per codeword is received or the indication of a configuration for transmission of up to 2 codewords through a PDSCH is no received via higher layer signaling, assuming that a limit value of the number of HARQ-ACK feedback bits designated per slot is K.

TABLE 7

| Condition for limit value K of number of HARQ-ACK feedback bits | Maximum number of PDSCHs of serving TRP per slot | Maximum number of PDSCHs per coordinating TRP per slot | Number of HARQ-ACK feedbacks designated per slot |
|---|---|---|---|
| N * maxNrofPDCCHs ≤ K | maxNrofPDCCHs | maxNrofPDCCHs | N * maxNrofPDCCHs |
| maxNrofPDCCHs + N − 1 ≤ K ≤ N * maxNrofPDCCHs | maxNrofPDCCHs | 1 | maxNrofPDCCHs + N − 1 |
| K ≤ maxNrofPDCCHs + N − 1 | 1 | 1 | N |

The maximum number of PDSCHs that can be transmitted by the serving TRP or coordinating TRPs may be determined to not exceed the limit value of the number of HARQ-ACK feedback bits designated per slot, by using Tables 6 and 7, in consideration of the number of Type-1 HARQ-ACK codebook bits and degree of freedom of PDSCH mapping.

Embodiment 2: HARQ-ACK Codebook Combining for Multi-PUCCH for NC-JT

When using NC-JT, a terminal may transmit a HARQ-ACK codebook corresponding to PDSCHs transmitted in different cells, TRPs, and/or beams, to a base station, via a single PUCCH or multiple PUCCHs. For the terminal to transmit the HARQ-ACK codebook via multiple PUCCHs, the different PUCCH resources may be indicated in the DCI scheduling the PDSCHs to be transmitted by multiple TRPs.

Figure 14:
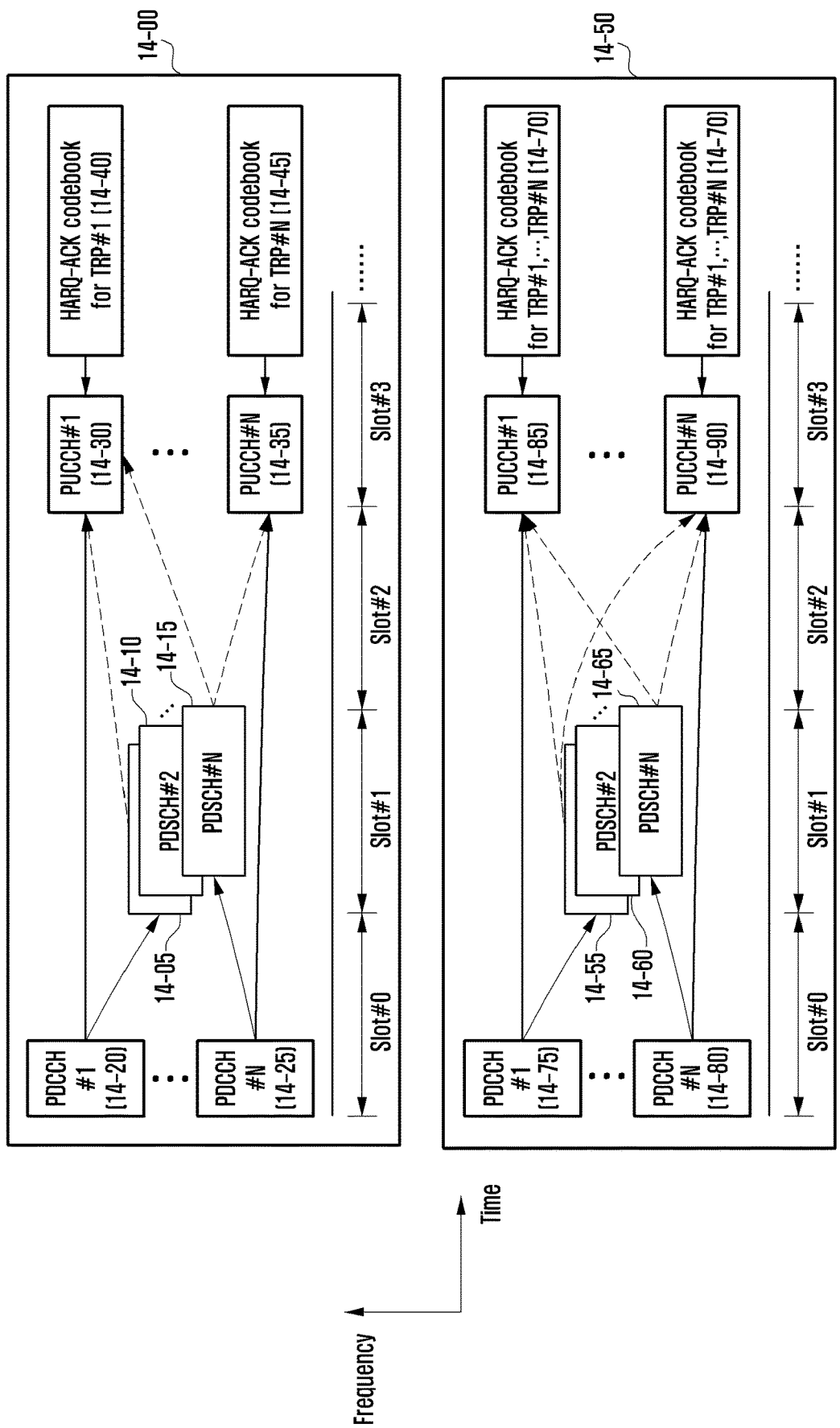
FIG. 14 illustrates a method for configuring HARQ-ACK codebooks to be transmitted through multiple PUCCHs according to an embodiment.

FIG. 14 illustrates a method for configuring HARQ-ACK codebooks to be transmitted through multiple PUCCHs according to an embodiment.

Referring to FIG. 14, case #1 14-00 shows a situation in which the terminal separately configures the HARQ-ACK codebooks corresponding to PDSCHs 14-05, 14-10, and 14-15 transmitted in different cells, TRPs, and/or beams. The terminal may separately transmit the PUCCHs 14-30 and 14-35 on PUCCH resources indicated by the DCIs carried in the PDCCHs 14-20 and 14-25 to the TRPs transmitted the respective PDSCHs. This method is advantageous in terms of preventing the number of HARQ-ACK codebook bits from linearly increasing according to the number of TRPs by transmitting the HARQ-ACK codebooks 14-40 and 14-45 to the corresponding TRPs.

Case #2 shows a situation in which the terminal configures a HARQ-ACK codebook 14-70 with the HARQ-ACK feedback bits corresponding to the PDSCHs 14-55, 14-60, and 14-65 transmitted in the respective cells, TRPs, and or beams. In this case, the terminal may multiplex the HARQ-ACK codebooks corresponding to the TRPs into the single HARQ-ACK codebook 14-70 and transmit the PUCCH 14-85 and 14-90 carrying the HARQ-ACK codebook 14-70 to all of the TRPs on the PUCCH resources indicated separately by DCIs carried in the PDCCHs 14-75 and 14-80 so as to improve the HARQ-ACK feedback reliability.

The embodiments described below provide methods for configuring HARQ-ACK codebooks for individual TRPs, methods for configuring concatenation of HARQ-ACK codebooks for all TRPs, and methods for transmitting indication of the configuration to a terminal, when the HARQ-ACK codebooks are transmitted through multiple PUCCHs for NC-JT.

Embodiment 2-1: Higher Layer Signaling-Based Configuration Method

When transmitting HARQ-ACK feedback bits corresponding to PDSCHs from multiple TRPs based on the individual PUCCH resource indications, per-TRP HARQ-ACK codebooks or a HARQ-ACK codebook may be configured by concatenating the HARQ-ACK codebooks for all of the TRPs. The base station may transmit an indication of a HARQ-ACK codebook configuration to the terminal via higher layer signaling.

When the base station transmits an indication of a per-TRP HARQ-ACK codebook configuration to the terminal via higher layer signaling, the terminal may generate HARQ-ACK codebooks for each of the TRPs and transmit the HARQ-ACK codebooks on the PUCCH resources indicated by the DCIs transmitted by the TRPs. For example, when receiving an indication of a Type-1 HARQ-ACK codebook configuration, the terminal may determine HARQ-ACK codebook bits based on the HARQ-ACK feedback information corresponding to PDSCHs scheduled by the DCI indicating the same PUCCH resources. When receiving an indication of a Type-2 HARQ-ACK codebook configuration, the terminal may determine HARQ-ACK codebook bits via the above-described [pseudo-code 3] based on the HARQ-ACK feedback information corresponding to the PDSCHs scheduled by the DCI indicating the same PUCCH resources based on the counter DAI and a total DAI of the DCI indicating the same PUCCH resources.

When the base station transmits an indication of a configuration of concatenating HARQ-ACK codebook for all TRPs to the terminal via higher layer signaling, the terminal may determine a slot to which the PUCCH carrying the HARQ-ACK feedback bits based on a PDSCH-to-HARQ_feedback timing indicator indicating a slot interval between the PDSCH scheduled by the DCI transmitted by each TRP and the corresponding HARQ-ACK feedback. The terminal may also determine the HARQ-ACK codebook bits based on the HARQ-ACK feedback information corresponding to the PDSCH scheduled by the DCI scheduling PUCCHs mapped to the same slot. For example, when receiving an indication of a Type-1 HARQ-ACK codebook configuration, the terminal may generate a HARQ-ACK codebook via the above-described [pseudo-code 1] and [pseudo-code 2]. If the PUCCH resources indicated by the DCI scheduling the PUCCHs in the same slot are different from each other, individual HARQ-ACK codebooks configured based on the PUCCH resources are concatenated to be bundled into a HARQ-ACK codebook for all TRPs. When receiving an indication of a Type-2 HARQ-ACK codebook, the terminal may determine HARQ-ACK codebook bits based on the counter DAI and the total DAI of the DCI scheduling PUCCHs in the same slot.

Embodiment 2-2: Method Based on Condition of Symbol-Level Overlapping

When the terminal is capable of transmitting multiple PUCCHs mapped to at least one same symbol in a slot, per-TRP HARQ-ACK codebooks or a HARQ-ACK codebook may be configured by bundling the per-TRP HARQ-ACK codebooks for all TRPs depending on whether the multiple PUCCH resources are overlapped at symbol level. If multiple PUCCH resources are overlapped at symbol level, the PUCCH resources allocated in a slot may include at least one same symbol. When multiple PUCCHs are scheduled in a slot for HARQ-ACK feedbacks corresponding to the PDSCHs from multiple TRP, if the PUCCH resources indicated by the DCIs from multiple TRPs are overlapped at the symbol level, the HARQ-ACK codebooks corresponding to the PDSCHs scheduled by the DCIs may be bundled together. When multiple PUCCHs are scheduled in a slot for HARQ-ACK feedbacks corresponding to the PDSCHs from multiple TRPs, if the PUCCH resources indicated by the DCIs from multiple TRPs are not overlapped at symbol level, HARQ-ACK codebooks corresponding to the PDSCHs scheduled by the DCIs from the individual TRPs are separately configured to be carried by PUCCHs, which are transmitted on the corresponding PUCCH resources.

Figure 15:
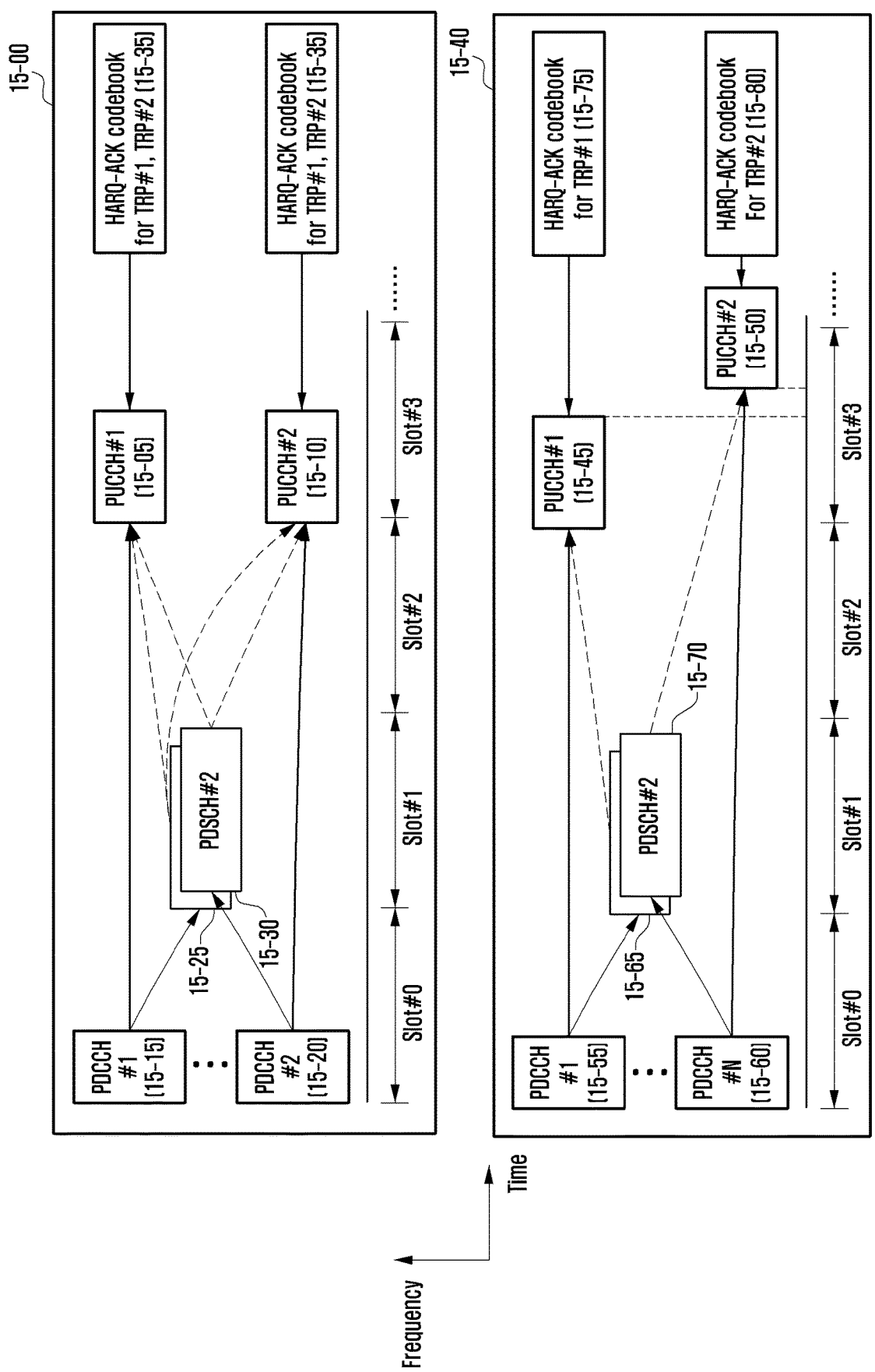
FIG. 15 illustrates a method for configuring a HARQ-ACK codebook based on a condition whether multiple PUCCH resources are overlapped at symbol level according to an embodiment.

FIG. 15 illustrates a method for configuring a HARQ-ACK codebook based on whether multiple PUCCH resources are overlapped at a symbol level according to an embodiment. Specifically, FIG. 15 illustrates a situation of configuring per-TRP HARQ-ACK codebooks based on the multiple PUCCHs resources being overlapped at the symbol level and a situation of bundling all the per-TRP HARQ-ACK codebooks together based on the multiple PUCCHs resources not being overlapped at the symbol level.

Referring to FIG. 15, in situation #1 15-00, the feedbacks corresponding to the PDSCHs 15-25 and 15-35 indicated by DCIs carried in the PDCCHs 15-15 and 15-20 from multiple TRPs are bundled into a HARQ-ACK codebook 15-35, which is carried by multiple PUCCHs 15-05 and 15-10 scheduled in a slot. Because the PUCCH resources indicated by the DCIs scheduling the PUCCHs in the same slot, the terminal may configure HARQ-ACK codebooks corresponding to the PUCCH resources and concatenate the HARQ-ACK codebooks into the HARQ-ACK codebook 14-35, which is transmitted to each TRP.

In situation #2 15-40, the PUCCH resources indicated by DCIs carried in the PDCCHs 15-55 and 15-60 from multiple TRPs for scheduling multiple PUCCHs 15-45 and 15-50 in a slot are not overlapped at the symbol level. The terminal may generate HARQ-ACK codebooks 15-75 and 15-80 corresponding to PDSCHs 15-65 and 15-70 scheduled by the DCIs from multiple TRPs and transmit the HARQ-ACK codebooks on the PUCCH resources 15-45 and 15-50 indicated by the DCIs from the individual TRPs.

When the terminal does not support multiple PUCCHs mapped to at least one same symbol in a slot, it may bundle information items for multiple PUCCHs into a single PUCCH. The terminal may also bundle multiple HARQ-ACK codebooks to be carried by multiple PUCCHs mapped to at least one symbol into a HARQ-ACK codebook. The HARQ-ACK codebook configured by the terminal may be carried by a PUCCH, which is transmitted on the PUCCH resources allocated by the serving TRP.

Embodiment 2-3: Method for Scheduling Multiple PUCCHs with Single PDCCH

In NC-JT, a terminal may receive PDSCH scheduling information of all TRPs via DCI from a serving TRP. Multiple PUCCH resources may be allocated via the DCI being transmitted by the serving TRP in order to receive HARQ-ACK feedbacks corresponding to PDSCHs transmitted from multiple TRPs. More specifically, the base station may configure the DCI being transmitted by the serving TRP to indicate PUCCH resources corresponding to the TRPs participating in PDSCH coordinated transmission, and the terminal may generate a HARQ-ACK codebook corresponding to the PDSCHs from all of the TRPs and transmit HARQ-ACK feedback bits on the per-TRP PUCCH resources separately. However, the terminal may also be configured to generate per-TRP HARQ-ACK codebooks corresponding to the PDSCHs from all the TRPs or HARQ-ACK codebook bundling per-TRP HARQ-ACK codebooks corresponding to the PDSCHs from all the TRPs as described in Embodiment 2-1 or 2-2.

Table 8 below provides an example of information on PUCCH resources corresponding to TRPs participating in the PDSCH coordinated transmission, the PUCCH resources being indicated by DCI transmitted by the serving TRP. In order to configure a single DCI to indicate multiple PUCCH resources, a per-TRP PUCCH resource indicator may be defined for indicating PUCCH resources per TRP. Although this method is advantageous in terms of improving degree of freedom of PUCCH resource allocation because the PUCCH resources are indicated per TRP, it may have a drawback in that the per-TRP PUCCH resource indicator bits increase the DCI overhead.

TABLE 8

| $1^{st}$ PUCCH resource indicator | $2^{nd}$ PUCCH resource indicator | $1^{st}$ PUCCH resource | $2^{nd}$ PUCCH resource |
|---|---|---|---|
| 000 | 000 | $1^{st}$ resource in PUCCH resource set | $1^{st}$ resource in PUCCH resource set |
|  | 001 |  | $2^{nd}$ resource in PUCCH resource set |
|  | ... |  | ... |
|  | 111 |  | $8^{th}$ resource in PUCCH resource set |
| ... | ... | ... | ... |
| 111 | 000 | $8^{th}$ resource in PUCCH resource set | $1^{st}$ resource in PUCCH resource set |
|  | 001 |  | $2^{nd}$ resource in PUCCH resource set |
|  | ... |  | ... |
|  | 111 |  | $8^{th}$ resource in PUCCH resource set |

If multiple PUCCH resource indicators indicate the same PUCCH resources, the terminal may transmit the HARQ codebooks corresponding to the PDSCHs from the TRPs corresponding to the PUSCH resource indicators indicating the same PUCCH resource on the PUCCH resources that are commonly indicated by the PUCCH resource indicators.

Table 9 below provides an example of information on PUCCH resources corresponding to the TRPs participating in the PDSCH coordinated transmission, the PUCCH resources being indicated by DCI transmitted by the serving TRP. In order for a single DCI to indicate multiple PUCCH resources, a number of PUCCH resources included in a PUCCH resource set may be increased according to the number of coordinated TRPs and allow a single code point of a PUCCH resource indicator to indicate multiple PUCCH resources corresponding to all the TRPs. This method is advantageous in terms of indicating multiple PUCCH resources without compromising the number of PUCCH resource indicator bits in DCI as in the case of indicating single PUCCH resources, even though the number of PUCCH resource sets being transmitted to the terminal via higher layer signaling.

TABLE 9

| PUCCH resource indicator | PUCCH resource |
| --- | --- |
| 000 | $1^{st}$ resource in PUCCH resource set, $9^{th}$ resource in PUCCH resource set |
| 001 | $2^{nd}$ resource in PUCCH resource set, $10^{th}$ resource in PUCCH resource set |
| ... | ... |
| 111 | $8^{th}$ resource in PUCCH resource set, $16^{th}$ resource in PUCCH resource set |

Embodiment 2-4: Method for Scheduling Multiple PUCCHs with Multiple PUCCHs

As an example of NC-JT, a terminal may receive PDSCH resource allocation information being transmitted by coordinated TRPs via PDCCH or DCI from the respective coordinated TRPs. In this case, the coordinated TRPs may separately receive the HARQ-ACK feedbacks, which correspond to the PDSCHs transmitted by the coordinated TRPs, through multiple PUCCHs for non-ideal backhaul between TRPs. To this end, when NC-JT is indicated by multiple PDCCHs or DCIs, the PUCCH resource indicators indicating the PUCCH resources for HARQ-ACK feedback in the DCIs should be set to different values. That is, in the NC-JT based on multiple DCIs, each coordinated TRP may receive HARQ ACK/NACK feedback through per-TRP PUCCH resources, and the terminal may not expect that the PUCCH resource indicators from the coordinated TRPs participated in the NC-JT are set to the same value. The terminal may separately generate HARQ-ACK codebooks corresponding to the PDSCHs from the respective coordinated TRPs and transmit the HARQ-ACK codebooks on the separate PUCCH resources. The terminal may not expect to bundle the HARQ-ACK codebooks corresponding to the PDSCHs being transmitted by the coordinated TRPs.

For TRP-specific PUCCH resource allocation, PUCCH resource indication is restricted differently depending on whether the terminal supports multi-panel or multi-beam simultaneous transmission (i.e., depending UE capability). For example, if the terminal supports UL multi-panel/beam transmission or spatial relation/TCI state configuration, it may receive an indication of a configuration of the PUCCHs, to be transmitted to the cooperated TRPs, carrying different panel/beam/spatial information or TCI state at the same OFDM symbol. However, if the terminal does not support UL multi-panel/beam transmission or spatial relation/TCI state configuration, it may not expect to receive an indication of a configuration of the PUCCHs, to be transmitted to the cooperated TRPs, carrying different panel/beam/spatial information or TCI state at the same OFDM symbol. When the terminal that does not support UL multi-panel/beam transmission or spatial relation/TCI state configuration receives an indication of a configuration of different PUCCH resources for NC-JT at the same OFDM symbol, it may transmit information integrated according to the ACK/NACK feedback bundling method of embodiment 2-2 on single PUCCH resources, ignoring the above-described per-TRP PUCCH transmission operation. In this case, the single PUCCH resources may be determined according to a predetermined priority order, e.g., priority order of PDCCH or PDSCH resources associated with the different PUCCH resources.

The detailed method for configuring the HARQ-ACK codebooks corresponding to the PDSCHs transmitted by the cooperated TRPs may be performed as described above.

The multi-TRP coordinated transmission may be implemented in an ideal backhaul environment considering no backhaul delay and a non-ideal backhaul environment considering a backhaul delay. In the ideal backhaul and non-ideal backhaul environments, an indication of a configuration of PUCCH resource sets for TRPs may be transmitted via RRC signaling and specific PUCCH resources may be allocated via DCI. An indication of a configuration of at least one PDSCH resource allocation per TRP and at least one corresponding PUCCH resource allocation may also be transmitted. In the non-ideal backhaul environment, terminal an indication of a configuration of per-coordinated TRP PUCCH resources that are overlapped in at least one of the time domain, frequency domain, and special domain may be transmitted to the terminal. When the PUCCH resources are overlapped in the time domain, the overlapped PUCCH resources may be at least one OFDM symbol in the same slot as described with reference to FIG. 16 below.

Embodiment 3: Method for Transmitting UL Control Information (UCI) on Overlapped Resources Embodiment 3 provides a UCI transmission method of a terminal allocated PUCCH resources that are at least partly overlapped in a NC-JT scenario.

Embodiment 3 provides a method for selecting at least one of multiple PUCCH resources based on various conditions in an NC-JT scenario, and a method for multiplexing UCIs in a predetermined priority order based on various resource conditions.

Embodiment 3 also provides a method for adjusting PUCCH resource locations for UCI transmission.

Embodiment 3 provides a method by a terminal for not expecting overlapped PUSCH resources from a base station.

Embodiment 3 provides a method for transmitting separate HARQ-ACK/NACK payload/feedback or jointed HARQ-ACK/NACK payload/feedback.

Embodiment 3-1: Method for Dropping or Multiplexing Multiple UCIs to be Transmitted in a Priority Order of PUCCH Resources that is Determined Based on Predetermined Conditions FIG. 16 illustrates PUCCH resource configuration operations of a terminal according to an embodiment.

Figure 16:
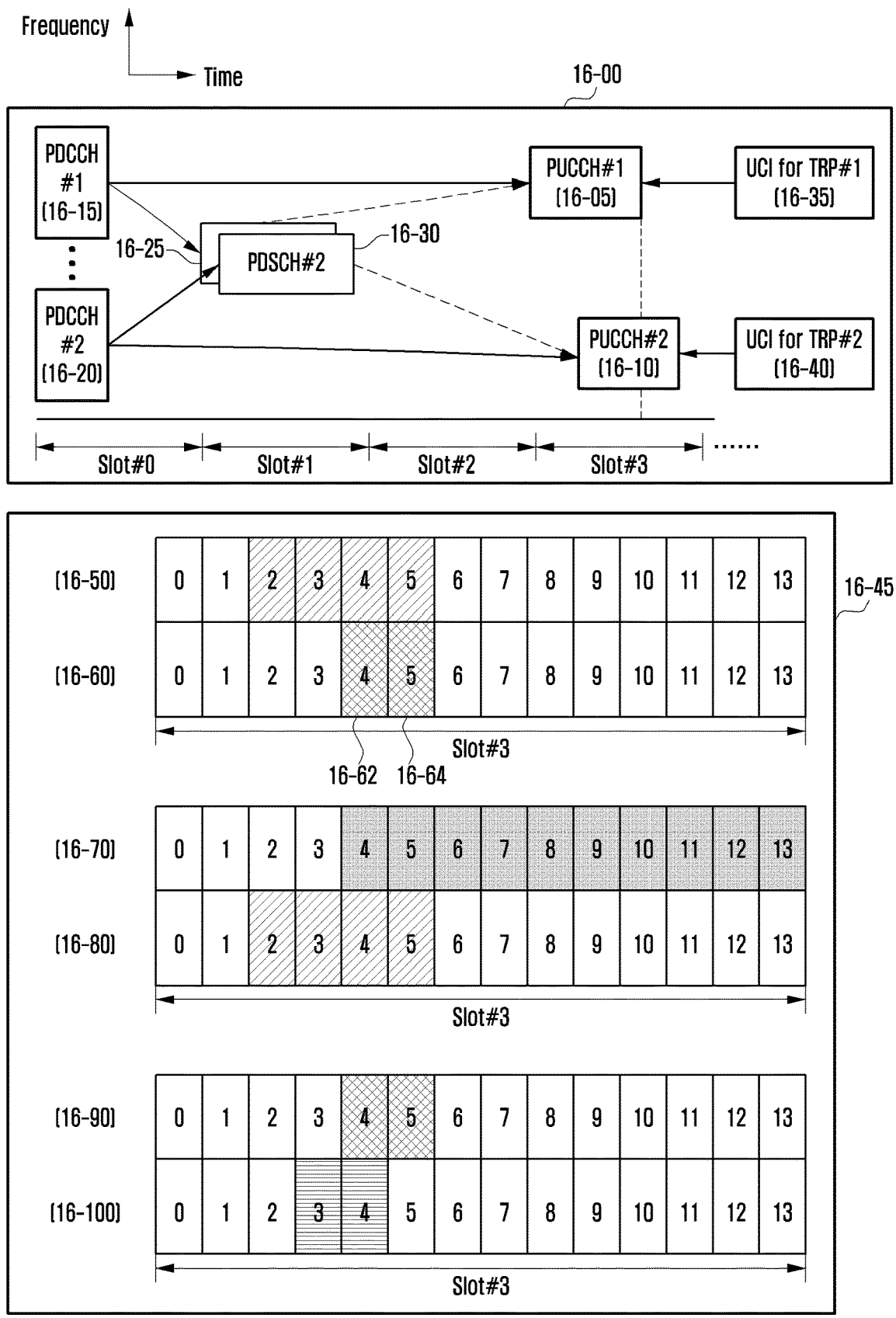
FIG. 16 illustrates PUCCH resource configuration operations of a terminal according to an embodiment.

Referring to FIG. 16, because two PUCCH resources (PUCCH #1 and PUCCH #2) 16-05 and 16-10 for NC-JT are overlapped at at least one OFDM symbol, the terminal may transmit the UCI scheduled on one PUCCH resource with a higher priority (e.g., UCI for TRP #1 16-35) and drop the UCI scheduled on the other PUCCH resource with a lower priority (e.g., UCI for TRP #2 16-40).

Various conditions may be considered in order to determine to drop a certain UCI.

In the embodiments disclosed hereinbelow, various UCI includes HARQ-ACK.

The terminal may preferentially transmit the HARQ-ACK codebooks corresponding to the PDSCHs 15-25 and 16-30 from specific TRPs on the PUCCH resources indicated by the DCIs carried in the PDCCHs 16-15 and 16-30 transmitted by the TRPs. The specific TRP with the higher priority may be determined by the base station. This TRP may be implicitly understood as a TRP that was first connected to the base station or a TRP of a serving cell. The PUCCH scheduled on the PUCCH resource for the TRP with the lower priority may be dropped.

Alternatively, the terminal may transmit the HARQ-ACK codebook scheduled on the PUCCH resource indicated by the DCI received in a specific CORESET or/and search space configured by the base station and drop HARQ-ACK codebooks scheduled on the other PUCCH resources.

The terminal may preferentially transmit specific UCI contents designated by the base station. When the UCI scheduled on PUCCH #1 16-05 is a HARQ-ACK codebook and the UCI scheduled on the PUCCH #2 16-10 is CSI, the terminal may transmit PUCCH #1 resource based HARQ-ACK codebook transmission based on priority. However, a PUCCH #2 resource based CSI transmission may be not performed. The UCI contents may be prioritized in the order of HARQ-ACK>SR>CSI (CQI, PMI, RI) or SR>HARQ-ACK>CSI (CQI, PMI, RI). The UCI contents may also be prioritized in the order of HARQ-ACK & SR>CSI.

Alternatively, if all types of CSI are equally prioritized by the base station, the terminal may prioritize the types of CSI using Equation (1) below and preferentially transmit the CSI of the type prioritized over the other types. The lower the value of $Pr_{iCSI}(y,k,c,s)$ for determining priority, the higher the priority.

$$Pr_{iCSI}(y,k,c,s) = 2 \cdot N_{cells} \cdot M_s \cdot y + N_{cells} \cdot M_s \cdot k + M_s \cdot c + s \quad (1)$$

In Equation (1), y may be set to 0 when an aperiodic CSI report is carried by the PUSCH, 1 when a semi-persistent CSI report is carried by the PUSCH, and 3 when a periodic CSI report is carried by the PUCCH. Additionally, k may be set to 0 when the CSI include L1-RSRP and 1 when the CSI includes no L1-RSRP. Further, c may be set to an index of the serving cell index, $N_{cells}$ may be set to a value of a higher layer parameter maxNrojServingCells, s may be set to a value of CSI-report identifier CSI-ReportConfigID, and M may be set to a value indicating a number of CSI report configurations maxNrofCSI-ReportConfigurations (e.g., 0 to 47) by the base station.

If the resources for CSI reports are overlapped at at least one OFDM symbol as illustrated in the time domain in FIG. 16, the two CSI reports may collide with each other. Particularly, if the values of y are neither 2 nor 3 and differ between the two CSI reports, the terminal may drop the CSI report with the larger $Pr_{iCSI}(y,k,c,s)$. If the values of y are equal between the two CSI reports, the CSI report with the larger $Pr_{iCSI}(y,k,c,s)$ may be dropped.

If it is indicated to transmit the same type of UCI contents, the UCI of which contents larger in size or having characteristics of eMBB/URLLC may be prioritized. The UCIs may be prioritized by considering various metrics in a mixed manner.

Alternatively, the terminal may prioritize transmitting the UCI scheduled on the PUCCH resource longer than that for the other UCI in the time domain. The UCI scheduled on the PUCCH resource 16-70 occupying 10 OFDM symbols may be prioritized over the UCI scheduled on the PUCCH resource 16-80 occupying 4 OFDM symbols.

The terminal may prioritize transmitting the HARQ-ACK codebook indicated with a specific RNTI among various RNTIs. The RNTIs may include C-RNTI, random access RNTI (RA-RNTI), system information RNTI (SI-RNTI), and paging RNTI (P-RNTI), which may be prioritized in the enumerated order.

The terminal may prioritize transmitting the UCI scheduled on the PUCCH resources indicated at the latest PDCCH transmission timing, i.e., the UCI scheduled on the PUCCH resources indicated at the oldest PUCCH transmission timing.

If the PUCCH resources allocated for a short PUCCH supporting PUCCH formats 0 and 2 and a long PUCCH supporting PUCCH formats 1, 3, and 4 are overlapped, the short (or long) PUCCH may be dropped, and the long (or short) PUCCH may be transmitted. In this case, the terminal may prioritize the PUCCH resources by applying the above-described prioritization methods in a mixed manner.

The UCIs may be transmitted on PUSCH resources as well as PUCCH resources. When both the PUCCH and PUSCH resources are considered, the terminal may prioritize transmitting the UCI scheduled on the configured grant PUSCH resources or grant-based PUSCH resource.

Although the descriptions are directed to transmissions overlapping at at least one OFDM symbol in the time domain, if at least two PUCCH resources, even if they are not overlapped at all at any symbol in the time domain, are allocated in a slot, the terminal may transmit only the UCI scheduled on the PUCCH resources that is prioritized as described above.

Although the prioritization is performed based on specific metrics above, the disclosure is not limited by the metrics. That is, the prioritization may be performed with any or a combination of other metrics as well as the above-described metrics.

When two PUCCH resources for NC-JT are overlapped at at least one OFDM symbol as illustrated in FIG. 16, the terminal may drop a transmission scheduled on the PUCCH resource with a lower priority and multiplex the UCIs for two TRPs associated with the NC-JT on the PUCCH resource with a higher to transmit them together.

In this case, the UCIs may be multiplexed on the PUCCH resource with the higher priority in consideration of various conditions. The UCls may be multiplexed in the same manner as that for HARQ-ACK codebooks as described with reference to FIGS. 10 to 13 above.

The terminal may multiplex the UCIs scheduled on two different PUCCH resources on the PUCCH resources for the TRP with a higher priority to transmit them together. In this case, the base station may configure the specific TRP. The specific TRP may be implicitly understood as a TRP that was first connected to the base station or a TRP of a serving cell. The transmission scheduled on the PUCCH resources for the TRP with the lower priority may be dropped.

The terminal may multiplex the UCIs on the PUCCH resources, which were scheduled by the DCI received in a CORESET or/and search space prioritized by the base station over others, to transmit them together. The UCI scheduled in the PUCCH resources with the lower priority may be dropped.

The terminal may preferentially transmit the UCI carrying the UCI contents prioritized over others on the corresponding PUCCH resources. If the UCI scheduled in PUCCH #1 16-05 is a HARQ-ACK codebook and the UCI scheduled in the PUCCH #2 16-10 is CSI, the terminal may multiplex the HARQ-ACK codebook and CSI on the PUCCH #1 16-05 allocated for the HARQ-ACK codebook based on the priority. The CSI transmission scheduled on the PUCCH #2 may be dropped. The UCI contents may be prioritized in the order of HARQ-ACK>SR>CSI (CQI, PMI, RI) or SR>HARQ-ACK>CSI (CQI, PMI, RI). The UCI contents may also be prioritized in the order of HARQ-ACK & SR>CSI.

If all the types of CSI are equally prioritized by the base station, the terminal may prioritize the types of CSI by Equation (1) as described above and transmit the CSI of the type prioritized over the other types preferentially. The lower the value of $Pri_{iCSI}(y,k,c,s)$ for determining priority, the higher the priority.

If the resources for CSI reports are overlapped at at least one OFDM symbol as illustrated in the time domain in FIG. 16, two CSI reports may collide with each other. If the values of y are equal between the two CSI reports, the CSI report with the larger $Pri_{iCSI}(y,k,c,s)$ may be dropped or multiplexed into the CSI report along with the smaller $Pri_{iCSI}(y,k,c,s)$ to be transmitted together.

If it is indicated to transmit the same type of UCI contents, the UCI of which contents larger in size or having characteristics of eMBB/URLLC may be prioritized. The UCIs may be prioritized by considering various metrics in a mixed manner.

Alternatively, the terminal may multiplex the UCIs designated by the base station on the PUCCH resource longer than the other PUCCH resource in the time domain to transmit them together. The UCI scheduled on the PUCCH resource 16-70 occupying 10 OFDM symbols may be prioritized over the UCI scheduled on the PUCCH resource 16-80 occupying 4 OFDM symbols.

The terminal may multiplex the UCIs designated by the base station on the PUCCH resources indicated with a specific RNTI over the others to transmit them together. The RNTIs may include C-RNTI, RA-RNTI, SI-RNTI, and P-RNTI, which may be prioritized in the enumerated order.

The terminal may multiplex the UCIs on the PUCCH resources indicated by the PDCCH transmitted at the latest PDCCH transmission timing, i.e., the UCI scheduled on the PUCCH resources indicated at the oldest PUCCH transmission timing.

If the PUCCH resources allocated for a short PUCCH supporting PUCCH formats 0 and 2 and or long PUCCH supporting PUCCH formats 1, 3, and 4 are overlapped, the terminal may select one of the PUCCH resources to multiplex the UCIs therein to transmit them together. In this case, the terminal may prioritize the PUCCH resources by applying the above-described prioritization methods in a mixed manner.

The UCIs may be transmitted on PUSCH resources as well as PUCCH resources and, when both the PUCCH and PUSCH resources are considered, the terminal may preferentially multiplex the UCIs on the configured grant PUSCH resources or grant-based PUSCH resource to transmit them together. In this case, the UCI scheduled on the PUCCH resources may be dropped.

Although the descriptions above are directed to when the transmissions are overlapped at at least one OFDM symbol in the time domain, if at least two PUCCH resources, even if they are not overlapped at all at any symbol in the time domain, are allocated in a slot, the terminal may multiplex the UCIs on the PUCCH resources prioritized over the others as described above, in order to transmit them together.

Although the prioritization is performed based on specific metrics above, the disclosure is not limited by these specific metrics. That is, the prioritization may be performed with any or a combination of other metrics as well as the above-described metrics.

Figure 17:
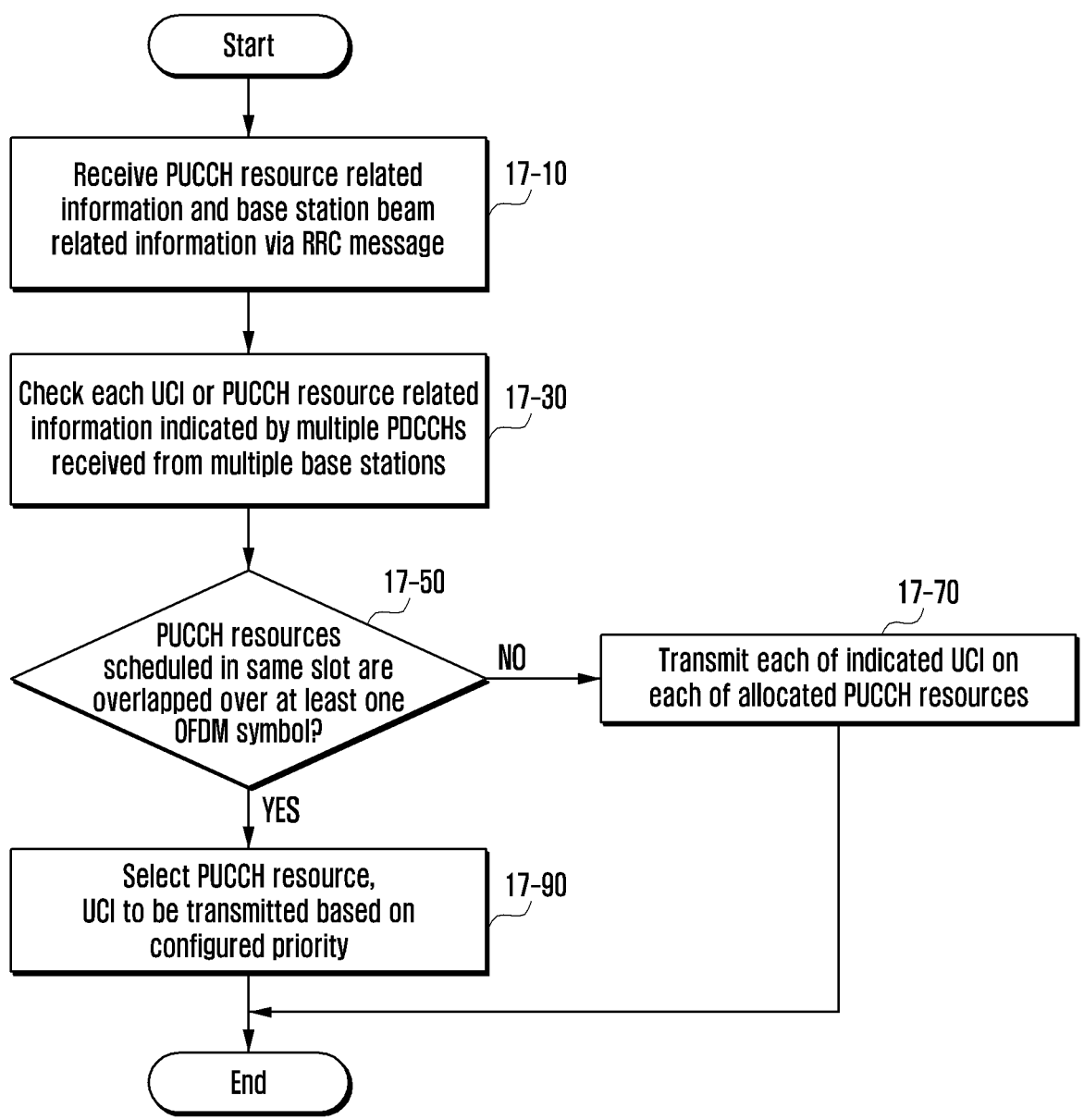
FIG. 17 illustrates operations of a terminal according to an embodiment.

FIG. 17 is a flowchart illustrating operations of a terminal according to an embodiment. Specifically, FIG. 17 is a flowchart illustrating operations of a terminal according to Embodiment 3-1.

Referring to FIG. 17, in step 17-10, the terminal receives PUCCH resource-related information and base station beam-related information via an RRC message. The PUCCH resource-related information and base station beam-related information may include PUCCH resource information, PUCCH resource set configuration information, PUCCH resource and spatial relation-related information, RS configuration and quasi co location (QCL) information for beam management, and TCI state information.

In step 17-30, the terminal identifies each of the UCI-related information or PUCCH resource-related information indicated by multiple PDCCHs received from multiple base stations. The UCI-related information may include HARQ-ACK and SR information, and the PUCCH resource-related information may include PUCCH resource indicator information.

In step 17-50, the terminal determines whether the PUCCH resources allocated in the same slot are overlapped at at least one OFDM symbol. This determination may be made based on the resource information received in step 17-10.

If it is determined that the PUCCH resources allocated in the same slot are overlapped at at least one OFDM symbol, in step 17-90, the terminal makes a PUCCH determination or UCI-related determination based on a result of the prioritization performed as described above. The UCI-related determination may include a determination as to whether to multiplex UCIs, a multiplexing order, and a determination as to whether to transmit the UCI. If it is determined that the PUCCH resources allocated in the same slot are not overlapped over at least one OFDM symbol, in step 17-70, the terminal separately transmits each of the UCIs on the corresponding PUCCH resources as scheduled.

Embodiment 3-2: Resource Location Adjustment Based on Some Condition (Priority)

When two PUCCH resources for NC-JT are overlapped at at least one OFDM symbol, the OFDM symbol location of one of the two PUCCH resources may be adjusted according to a priority order. The priority order may be determined by applying at least one of the conditions described in Embodiment 3-1. That is, at least one of TRP, CORESET/search space, UCI contents, PUCCH length, RNTI type, PDCCH transmission timing, and configured grant/grant based UL may constitute the condition for determining and setting the priority. Embodiment 3-2 is directed to a method for adjusting the resource location to transmit the UCIs that have been prioritized by the terminal.

Referring again to FIG. 16, in the lower part 16-45, it is assumed that two PUCCH resources 16-50 and 16-60 are allocated for NC-JT, 16-50 for short PUCCH and 16-60 for long PUCCH. The PUCCH resources are overlapped over two OFDM symbols 16-62 and 16-64. Unlike Embodiment 3-1 in which the terminal transmits the UCI scheduled on one PUCCH resource having a higher priority and drops the UCI scheduled on the other PUCCH resource having a lower priority, the terminal may transmit both the UCIs by adjusting the PUCCH resource location at the OFDM symbol level. The OFDM symbol-level adjustment of the PUCCH resource location may be determined in consideration of the starting positions of the PUCCH resources and the length of an OFDM symbol. That is, the PUCCH resource may be moved onto the UL transmission resources appearing earliest among the OFDM symbols over which the PUCCH resources are not overlapped. The OFDM symbol length may be maintained to avoid modification of the PUCCH format. However, the PUCCH format may also be modified in this embodiment.

It may be assumed that the PUCCH resource 16-50 is prioritized over the PUCCH resource 16-60. In this case, the PUCCH resources 16-60 scheduled over the OFDM symbols 16-62 and 16-64 may be moved to a location available for UL transmission in order to transmit the corresponding UCI because the PUCCH resources 16-60 have the lower priority. If symbols 6 and 7 are UL resources or resources available to be designated as UL resources, the terminal may move the PUCCH resources 16-60 scheduled over OFDM symbols 4 and 5 onto OFDM symbols 6 and 7 in order to transmit the corresponding UCI thereon. If the symbols 6 and 7 are DL resources or resources unavailable to be designated as UL resources, the terminal may transmit the corresponding UCI on another two OFDM symbol resources available for UL transmission within slot #3. If there are more than two OFDM symbols available for UL transmission, the terminal may transmit the corresponding UCI on the UL resources appearing earliest after symbols 4 and 5 within slot #3.

The terminal may adjust the starting position of the PUCCH resource with the lower priority in order to prevent the PUCCH resources for NC-JT from being overlapped in the time domain. In this case, it is not necessary to modify the PUCCH format. An indicator value of the PUCCH resource with the lower priority may be adjusted to prevent the PUCCH resources for NC-JT from being overlapped. That is, a new PUCCH resource that is not overlapped with the PUCCH resource with the higher priority at the symbol level may be selected among a PUCCH resource set configured via RRC. In this case, it is not necessary to modify the PUCCH format.

It may be assumed that the PUCCH resource 16-60 is prioritized over the PUCCH resource 16-50. The terminal may move the PUCCH resource 16-50 to a location available for UL transmission in order to transmit the corresponding UCI because the PUCCH resource 16-50 has the lower priority. Here, the terminal may move the PUCCH resource 16-50 scheduled over OFDM symbols 2 to 5 onto OFDM symbols 6 to 9 in order to avoid being overlapped with the PUCCH resource 16-60 at OFDM symbols 4 and 5. If OFDM symbols 6 to 9 are DL resources or resources unavailable to be designated as UL resources, the terminal may transmit the corresponding UCI over symbols 10 to 13 starting from symbol 10 as the earlies symbol available for UL transmission, maintaining symbol length of 4, within slot #3, without modifying the PUCCH format.

Alternatively, it may be assumed that two long PUCCH resources are allocated for NC-JT and the PUCCH resource 1670 is prioritized over the PUCCH resource 1680. In this case, the terminal may move the PUCCH resource 16-80 scheduled over OFDM symbols 2 to 5 to a location available for transmission because the PUCCH resource 16-80 has the lower priority. Here, the terminal may transmit the corresponding UCI on the PUCCH resource available for UL transmission within the next slot (slot #4) in order to prevent the PUCCH resource with the lower priority from being overlapped, in the time domain, with the PUCCH resource 16-70 scheduled over symbols 4 to 13 in slot #3. If the terminal determines that the UCI scheduled on the PUCCH resource with the lower priority cannot be transmitted in slot #3, it may drop the UCI transmission.

The terminal may modify the PUCCH format of the PUCCH resource 16-80 to fix the starting symbol of the PUCCH resource and reduce the size of the PUCCH resource to be fit to a symbol length of 2, which reschedules the PUCCH resource over OFDM symbols 2 and 3 and prevents the PUCCH resource with the lower priority from being overlapped with the PUCCH resource with the higher priority.

It may be assumed that the PUCCH resource 16-80 for a long PUCCH is prioritized over the PUCCH resource 16-70 for long PUCCH. In this case, the terminal may move the PUCCH resource 16-70 scheduled over OFDM symbols 4 to 13 to a location available for transmission because the PUCCH resource 16-70 has the lower priority. Here, the terminal may transmit the corresponding UCI on the PUCCH resource available for UL transmission within the next slot (slot #4) in order to prevent the PUCCH resource with the lower priority from being overlapped, in the time domain, with the PUCCH resource 16-80 scheduled over symbols 3 to 5 in slot #3. If the terminal determines that the UCI scheduled on the PUCCH resource with the lower priority cannot be transmitted in slot #3, it may drop the UCI transmission.

The terminal may modify the PUCCH format of the PUCCH resource allocated as denoted by reference number 16-70 in order to fix the starting symbol of the PUCCH resource and reduce the size of the PUCCH resource to be fit to a symbol length of 10, which reschedules the PUCCH resource over OFDM symbols 6-13 and prevents the PUCCH resource with the lower priority from being overlapped with the PUCCH resource with the higher priority.

It may be assumed that two short PUCCH resources 16-90 and 16-100 are allocated for NC-JT and the PUCCH resource 16-90 is prioritized over the PUCCH resource 16-100. In this case, the terminal may move the PUCCH resource 16-100 scheduled over OFDM symbols 3 and 4 to a location available for UL transmission to transmit the corresponding UCI because the PUCCH resource 16-100 has the lower priority. If symbols 6 and 7 are UL resources or resources available to be designated as UL resources, the terminal may move the PUCCH resource 16-100 scheduled over OFDM symbols 3 and 4 onto OFDM symbols 6 and 7 in order to transmit the corresponding UCI thereon. If the symbols 6 and 7 are DL resources or resources unavailable to be designated as UL resources, the terminal may transmit the corresponding UCI on another two OFDM symbol resources available for UL transmission within slot #3. If there are more than two OFDM symbols available for UL transmission, the terminal may transmit the corresponding UCI on the UL resources appearing earliest after symbols 6 and 7 within slot #3.

As described above, the terminal may adjust the starting position of the PUCCH resource with the lower priority in order to prevent the PUCCH resources for NC-JT from being overlapped in the time domain. In this case, it is not necessary to modify the PUCCH format. An indicator value of the PUCCH resource with the lower priority may be adjusted in order to prevent the PUCCH resources for NC-JT from being overlapped. That is, a new PUCCH resource that is not overlapped with the PUCCH resource with the higher priority at the symbol level may be selected among a PUCCH resource set configured via RRC. In this case, it is not necessary to modify the PUCCH format.

Alternatively, it may be assumed that the PUCCH resource 16-100 is prioritized over the PUCCH resource 16-90. In this case, the terminal may move the PUCCH resource 16-90 scheduled over OFDM symbols 4 and 5 to a location available for UL transmission to transmit the corresponding UCI because the PUCCH resource 16-90 has the lower priority. Here, the terminal may move the PUCCH resource 16-90 scheduled over symbols 4 and 5 onto symbols 5 and 6 in order to prevent the PUCCH resources with the lower priority from being overlapped, in the time domain, with the PUCCH resource 16-100 scheduled over symbols 3 and 4. If the symbols 5 and 6 are DL resources or resources unavailable to be designated as UL resources, the terminal may transmit the corresponding UCI on another two OFDM symbol resources available for UL transmission within slot #3 while maintaining the symbol length of 2 without any modification of the PUCCH format.

Embodiment 3-3: Transmission Based on a PUCCH Resource Configuration of a Base Station A base station may configure two PUCCH resources for NC-JT to a terminal, such that the PUCCH resources are not overlapped in the time domain. Using a PUCCH resource indicator, as shown in Tables 8 and 9, the terminal may transmit UCI on the resources identified by a PUCCH resource ID among a PUCCH resource set configured via RRC. In this case, each code point for which an indication is transmitted from a TRP to the terminal is mapped to the corresponding PUCCH. Here, a larger number of resource combinations are produced, and the base station may configure two PUCCH resources, which are separate in the time domain, for NC-JT to the terminal. However, the PUCCH resources may also be configured to be separated in the frequency and/or spatial domain as well as the time domain.

Figure 18:
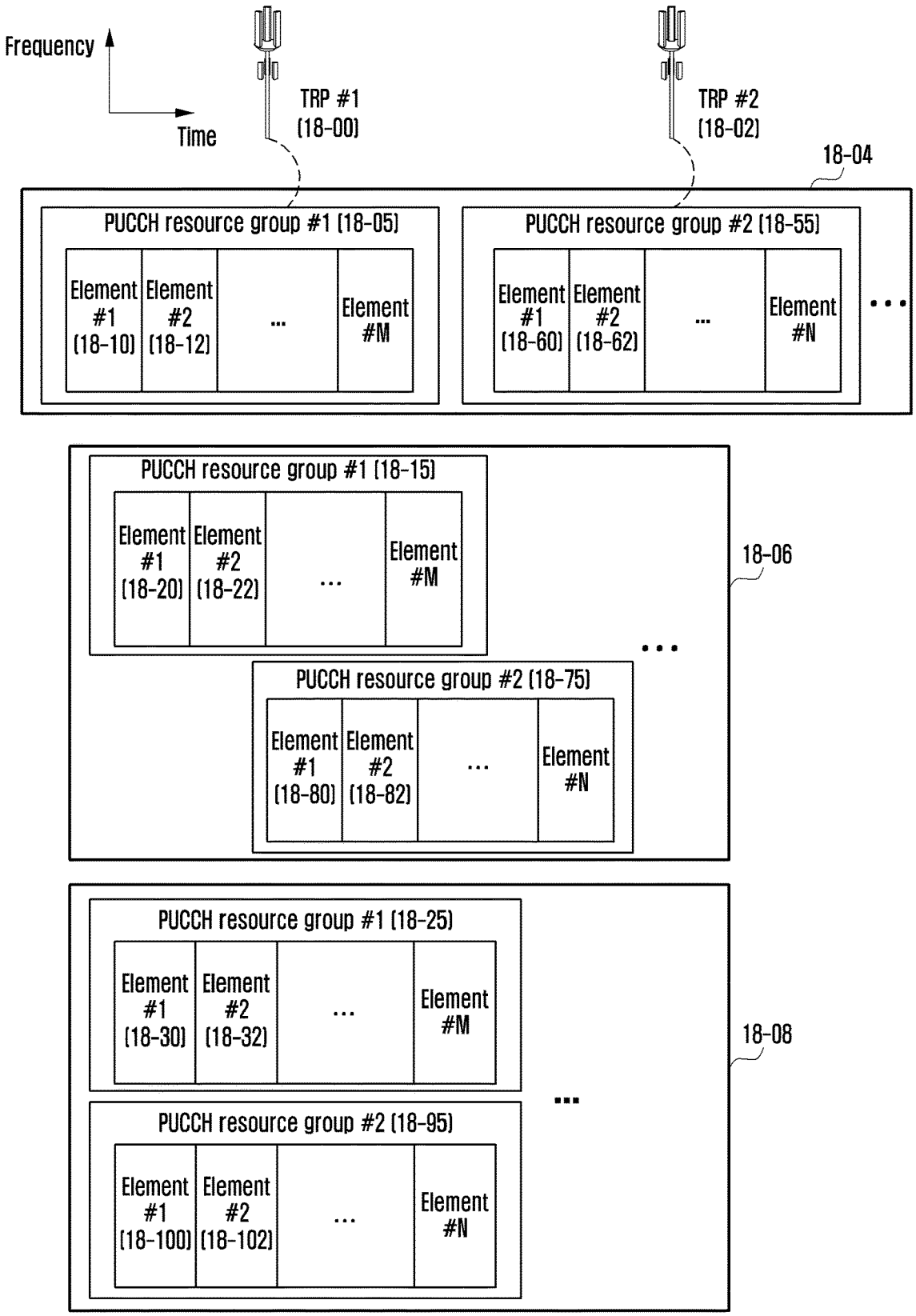
FIG. 18 illustrates PUCCH resource configuration operations of a terminal according to an embodiment.

FIG. 18 illustrates PUCCH resource configuration operations of a terminal according to an embodiment.

Referring to FIG. 18, the base station may allocate PUCCH resources 18-04 in the form of PUCCH resource groups 18-05 and 18-55, which are separated in the time domain, for NC-JT from two TRPs (TRP #1 18-00 and TRP #2 18-02) to the terminal. A PUCCH resource group may include a PUCCH resource or a PUCCH resource set. A PUCCH resource group may correspond to a PUCCH resource set. A PUCCH resource set may be interpreted as resources in the form of a subgroup of a PUCCH resource group.

A PUCCH resource may be interpreted as an element of a PUCCH resource group. The PUCCH resource groups 18-05 and 18-55 may be completely separated in the time domain when allocated by a unit of a subgroup (e.g., subgroup 18-10 & 18-12 and subgroup 18-60 & 18-62). The PUCCH resource groups 18-05 and 18-55 may also be completely separated in the time domain when allocated by a unit of an element (e.g., element 18-10 and element 18-60). The PUCCH resources may be completely separated in the frequency domain. The above-described method may be appropriate for resource allocation for transmission of separate HARQ-ACK/NACK payload/feedback. The PUCCH resources that are finally allocated to the terminal may be completely separated in the time domain and may or may not be completely separated in the frequency domain.

The base station may allocate PUCCH resources 18-06 in the form of PUCCH resource groups 18-15 and 18-75 for NC-JT from two TRPs to the terminal. A PUCCH resource group may include a PUCCH resource or a PUCCH resource set. A PUCCH resource group may correspond to a PUCCH resource set. A PUCCH resource set may be interpreted as resources in the form of a subgroup of a PUCCH resource group. A PUCCH resource may be interpreted as an element of a PUCCH resource group. The PUCCH resource groups may not be completely separated and may be overlapped in the time domain when allocated by a unit of a subgroup. The PUCCH resource groups may not be completely separated and may be overlapped in the time domain when allocated by a unit of an element. However, the base station may schedule the TRPs with coordinated configuration of (PUCCH resource group index for TRP #1, PUCCH resource group index for TRP #2) set to as (18-20, 18-80), (18-20, 18-82), (18-22, 18-80), or (18-22, 18-82) in order for the terminal to separately identify the resources. the PUCCH resources allocated to the terminal may be completely separated in the frequency domain.

The base station may allocate PUCCH resources 18-08 in the form of two per-TRP PUCCH resource groups 18-25 and 18-95 for NC-JT, which are completely overlapped in the time domain, to the terminal. A PUCCH resource group may include a PUCCH resource or a PUCCH resource set. A PUCCH resource group may correspond to a PUCCH resource set. A PUCCH resource set may be interpreted as resources in the form of a subgroup of a PUCCH resource group. A PUCCH resource may be interpreted as an element of a PUCCH resource group. The PUCCH resource groups that are completely overlapped in the time domain may not be separately identified when allocated by a unit of a subgroup. The PUCCH resource groups that are completely overlapped in the time domain may or may not be separately identified when allocated by a unit of an element.

The base station may schedule the TRPs with coordinated configuration of (PUCCH resource element index for TRP #1, PUCCH resource element index for TRP #2) set to (18-30, 18-102) or (18-32, 18-100) in order to be separately identified in the time domain.

Allocating resources for transmitting separate HARQ-ACK/NACK payloads/feedbacks may increase the scheduling complexity. The above-described method may be appropriate for allocating resources for joint HARQ-ACK/NACK payload/feedback transmission. The PUCCH resources allocated to the terminal may or may not be completely separated in the frequency domain.

Alternatively, the per-TRP PUCCH resources may be allocated such that the TRPs are separately identified based on PUCCH spatial relation information. The PUCCH spatial relation information is associated with a PUCCH resource ID during the resource configuration of the base station and, if per-TRP configuration is identified by the PUCCH spatial relation information, the TRP may be identified regardless of which code point of the PUCCH resource indicator in the DCI indicates the TRP. By transmitting UCI with PUCCH spatial relation information, the PUCCH resources may coordinated in order to not be overlapped in the time domain.

The base station may configure PUCCH resources that are not overlapped during a per-TRP PUCCH-Config configuration phase. The PUCCH-Config may be used for configuring per-BWP PUCCH parameters per terminal. The PUCCH-Config may be used for adding PUCCH resource-Set and PUCCH resourceSetID; and adding, changing, or deleting PUCCH resources and PUCCH resourceID, or change config of PUCCH format 1/2/3/4. Two PUCCH resources may be configured for NC-JT that are separated in the time domain.

The base station may separately configure per-TRP PUCCH resource sets such that the PUCCH resources are not overlapped. As a result, the terminal may separately identify the PUCCH resources sets composed of PUCCH resources for transmitting PUCCHs in the time domain such that the resources indicated in the per-TRP resource sets separated in the time domain are not overlapped.

The terminal configured to receive NC-JT may not expect that the PUCCH resources configured according to the various embodiments are overlapped. The terminal may not expect any indication crossing PUCCH resource subgroups or multiple indications with the same subgroup to be configured by the base station.

Although the embodiments described above are directed to HARQ-ACK codebooks being transmitted on the PUCCH resources, the disclosed methods may also be applied to the HARQ-ACK codebooks being multiplex and transmitted on PUSCH resources.

Although the embodiments described above are directed to UCIs transmitted on the PUCCH resources being the HARQ-ACK codebooks, the disclosed methods may also be applied to the UCIs being transmitted on the PUCCH resource including a scheduling request (SR) or CSI and a HARQ-ACK codebook.

Figure 19:
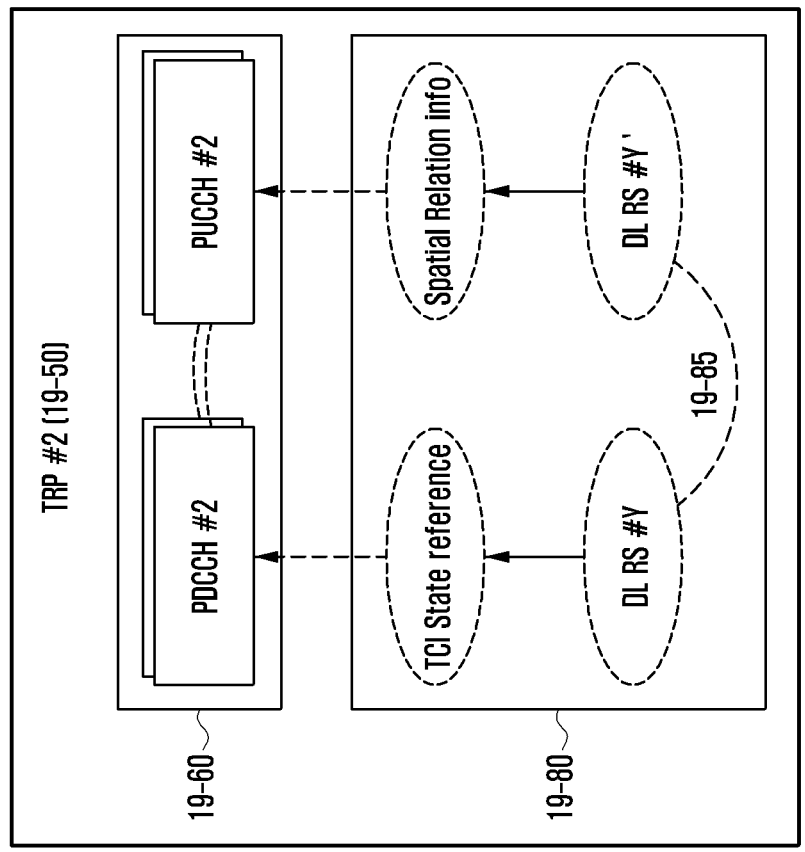
FIG. 19 illustrates a method for identifying PUCCHs corresponding to physical downlink control channels (PDCCHs) and per-transmission and reception point (per-TRP) PUCCH resources scheduled by PDCCHs according to an embodiment.
Figure 19:
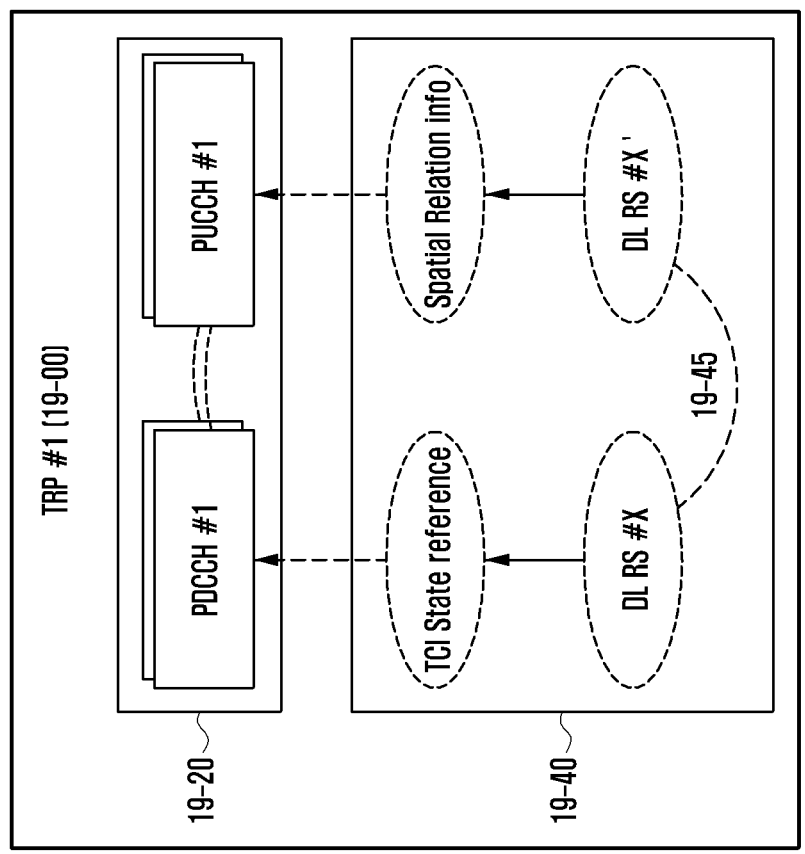

FIG. 19 illustrates a method for identifying PUCCHs corresponding to PDCCHs and per-TRP PUCCH resources scheduled by PDCCHs according to an embodiment.

Referring to FIG. 19, during the PDCCH scheduling, TRP #1 19-00 may be configured with the PDCCH scheduling the PDSCH and the PUCCH corresponding to the PDSCH as denoted reference number 19-20. The PDCCH #1 may include information for scheduling PUCCH #1 in consideration of PUCCH resources, PUCCH resource sets, and PUCCH resource groups, e.g., as described above with reference to FIG. 18. If PUCCH resource groups are multiplexed in a TDM manner, this may include when the PUCCH resources groups are partly or wholly overlapped.

The PDCCH #1 for TRP #1 19-00 is determined by a CORESET and search space configuration in the frequency domain, and the spatial domain configuration of the CORESET for the PDCCH may be determined by the TCI state reference to DL RS # X as denoted by reference number 19-40. When the DL RS # X is a CSI-RS, the base station may use the parameter qcl-InfoPeriodicCSI-RS to refer to TCI-StateID during NZP-CSI-RS-Resource configuration to the terminal via an RRC message.

Reference number 19-40 denotes that the TCI state reference operation is performed by referring to the TCI-stateID in NZP-CSI-RS-Resource under the assumption that the PDCCH and the DL RS # x are Quasi-co-located (QCLed) with each other. The PDCCH #1 for the TRP #1 19-00 may be configured diversely in the time and frequency domains, e.g., as described above with reference to FIG. 18. The PUCCH may also be configured in the spatial domain in association with the DL-RS because the PUCCH spatial relation information is configured in association with the DL-RS of the base station due to the nature of beamforming. Here, DL-RS X' may be an RS associated with various spatial domains (e.g., beam directions) for PUCCH transmission that is understood by the base station.

The PDCCH and PUCCH allocation and beamforming transmission may be determined according to the association 19-45 between the DL RS # X referred in the PDCCH #1 and the DL RS # X' referred according to the indication in the PUCCH spatial relation information as denoted by reference number 19-40. The association 19-45 may be produced such that the base station associates the two configuration values with each other. The method of producing the association may include configuring # X and # X' to be equal, such that the DL RS # X and the DL RS # X' become the same RS. The method of producing the association may also include setting # X and # X' such that the DL RS # X and DL RS #' become QCLed reference signals. That is, both the CORESET TCI state and PUCCH spatial relation information are referenced such that the PDCCH reception direction and the PUCCH transmission direction coincide.

The QCLed association may be configured through CSI-RS Resource settings and a configuration of the base station via an RRC message and updated via a MAC CE. The QCLed association may be configured in association with the defined QCL type A, B, C, or D, particularly, QCL type D. As another example, the base station may adjust one of two setting values according to a predetermined rule, even though the two values do not match. If the two setting values do not match, this may be the case of the DL RS # X and the DL RS # X' being the same RS or the case of the DL RS # X and the DL RS # X' being not QCLed with each other. One of the two values may be adjusted in such a way that the base station and the terminal use one of the CORESET TC state and the spatial relation information for the PDCCH #1 based on the same determination metric. For example, when the base station transmits an indication of NC-JT based on multi-DCI (e.g., multi-DCI based NCJT ON) to the terminal, the terminal may determine the PUCCH transmission direction based on the CORESET TCI state. The terminal may ignore the value of the PUCCH spatial relation information. Although the above-disclosed embodiment is directed to only the CORESET TCI state being referenced, the spatial relation information of the PUCCH may also be referenced.

The operations described in association with the TRP #1 19-00 may be applied to the TRP #2 19-50. The PDCCH #2 and PUCCH #2 are associated with each other in the same manner as described above as denoted by reference number 19-60, and referring the CORESET TCI state and spatial relation information related thereto have an association 19-85 as denoted by reference number 19-80 in the same manner as described above. Here, the DL RS # Y and DL RS # Y' are also referred in the same manner as described above as denoted by reference number 19-80.

The base station may configure the DL RS # X and DL RS # Y to be distinguished from each other by referring to the CORESET TCI state of TRP #1 19-00 and the CORESET TCI state of the TRP #2 19-50. The base station transmits QCL configuration including information on the reception beams carrying the distinguished DL RSs (e.g., CSI RS, tracking RS (TRS), and DM-RS) to the terminal. For example, if the DL RS is a CSI-RS, this may be indicated by the TCI-StateID in the NZP-CSI-RS-Resoune using the parameter qc-InfoPeriodicCSI-RS during the RRC configuration procedure. The reception beam information may be implicitly included or identified per TRP. If the configuration is received from the base station, the terminal may form beams to TRP #1 and TRP #2 for transmitting UCI including HARQ-ACK, regardless of whether the PUCCHresources, PUCCH resource sets, and PUCCH resource groups are partly/wholly overlapped or in the time and frequency domains or multipleexed in TDM.

In accordance with an embodiment, a method is provided for configuring a HARQ-ACK codebook according to a time domain interval between per-TRP PUCCH resources for JC-JT.

Table 10 provides a method for configuring a type-1 HARQ-ACK codebook or a type-2 HARQ-ACK codebook according to a time interval between per-TRP PUCCH resources.

TABLE 10

When the (two or more different) PUCCH resources (for two or more different TRPs), which are indicated by PUCCH resource indicator and PDSCH-to-HARQ_feedback timing indicator fields of multiple DCIs for NC-JT, are in different slots, both type-1 HARQ-ACK codebook and type-2 HARQ-ACK codebook are supported
    FFS, additional specification impact from Rel-15
When the PUCCH resources, which are indicated by PUCCH resource indicator and PDSCH-to-HARQ feedback timing indicator fields of multiple DCIs for NC-JT, are in different subslots, both type-1 HARQ-ACK codebook and type-2 HARQ-ACK codebook are supported.

TABLE 10-continued

FFS, definition of the subslot
FFS, DAI counts for type-2 HARQ-ACK codebook per subslot
FFS, how to count the number of possible PDSCHs in a slot for type-1 HARQ-ACK codebook
When the PUCCH resources, which are indicated by PUCCH resource indicator and PDSCH-to-HARQ_feedback timing indicator field of multiple DCIs for NC-JT, are overlapped at least one OFDM symbol, both type-1 HARQ-ACK codebook and type-2 HARQ-ACK codebook are supported
UE selects one PUCCH resource
FFS, priority rule details
Individual HARQ-ACK feedbacks per TRP are generated and multiplexed
UE performs individual DAI count for type-2 HARQ-ACK codebook per CORESET-group
FFS, how to count the number of possible PDSCHs in a slot for type-1 HARQ-ACK codebook In Table 10, at least two different PUCCH resources for transmission to at least two different TRPs participating in multi-DCI-based NC-JT are mapped to slots or OFDM symbols being determined based on the PUCCH resource indicators and PDSCH-to-HARQ_feedback timing indicator field values included in the respective DCIs. Here, the at least two different PUCCH resources for transmission to at least two different TRPs may be allocated to (or scheduled in) 1) different slots, 2) different OFDM symbols of the same slot, or 3) OFDM symbols including at least one OFDM symbol at which the PUCCH resources are overlapped. When the different PUCCH resources are allocated to or scheduled in different slots or different OFDM symbols of the same slot, the two different PUCCH resources are not allocated to (or scheduled in) the same OFDM symbols.

When the different PUCCH resources for transmission to the different TRPs are allocated to or scheduled in different slots, both the type-1 HARQ-ACK codebook and type-2 HARQ-ACK codebook may be supported according to the above-described methods.

When the different PUCCH resources for transmission to the different TRPs are allocated to or scheduled in different OFDM symbols in the same slot, the base station and the terminal may define a sub-slot consisting of X OFDM symbols (X<14). X may be preset to a value, e.g., 7, or one of multiple values e.g., 2, 4, and 7, via higher layer configuration. In this case, X for the last sub-slot in a slot may set to a value less than the preset value considering the number of OFDM symbols (14 OFDM symbols) constituting a slot.

When the PUCCH resources allocated to or scheduled in different OFDM symbols in the same slot are allocated to or scheduled in different sub-slots, at least one of the type-1 HARQ-ACK codebook and type-2 HARQ-ACK codebook may be supported according to one of the following methods.

When the sub-slot-based HARQ-ACK feedback is configured between the base station and the terminal, the unit to be counted in association with the counter DAI or the total DAI may be changed from slot to sub-slot to configure the type-2 HARQ-ACK codebook.

As another example, the method may be modified for counting the maximum number of PDSCH assignable within a slot between the base station and the terminal to configure the type-1 HARQ-ACK codebook. For example, when a sub-slot-based HARQ-ACK feedback is configured between the base station and the terminal, "maximum number of PDSCH assignable within a slot" may be changed to "maximum number of PDSCHs assignable (or being assigned) within the corresponding sub-slot among the PDSCHs assignable within a slot" to configure the type-1 HARQ-ACK codebook. As another example, when a sub-slot-based HARQ-ACK feedback is configured between the base station and the terminal, "maximum number of PDSCH assignable within a slot" may be changed to "maximum number of PDSCHs schedulable by DCI transmitted in a specific PDCCH group among PDSCHs assignable within a slot (or in the case where the maximum numbers of PDSCHs schedulable by DCIs transmitted in PDCCH groups are differ from each other, largest, smallest, or average value of them)" to configure the type-1 HARQ-ACK codebook. In this embodiment, a CORESET group may be understood as a set of one or more per-TRP CORESETs, i.e., a set of CORESETs with the same activate TCI state.

When the different PUCCH resources for transmission to the different TRPs are allocated to or scheduled in OFDM symbols including at least one OFDM symbol at which the PUCCH resources are overlapped, the base station and the terminal may select one of the PUCCH resources overlapped with each other or a new PUCCH resource. The PUCCH resource selection may be made by selecting the PUCCH resource indicated by DCI detected at the latest PDCCH monitoring occasion among DCIs indicating the PUCCH resources overlapped with each other or selecting the PUCCH resource utilizing the highest transmit power or energy based on the PUCCH power control.

After selecting a PUCCH resource between the base station and the terminal, the terminal may generate and multiplex per-TRP PDSCH HARQ-ACK feedbacks. The per-TRP PDSCH HARQ-ACK feedbacks may be independently generated and concatenated in series or multiplexed according to one of HARQ-ACK multiplexing methods described above.

Thereafter, the base station and the terminal may support at least one of the type-1 HARQ-ACK codebook and type-2 HARQ-ACK codebook according to one of the following methods.

The terminal may count counter DAIs or total DAIs per CORESET group in order to configure the type-2 HARQ-ACK codebook.

Alternatively, the method for counting the maximum number of PDSCHs assignable within a slot between the base station and the terminal may be modified in order for the terminal to configure the type-1 HARQ-ACK codebook. For example, when UCI multiplexing-based (or joint A/N feedback-based) HARQ feedback is configured (or indicated) between the base station and the terminal, the terminal may change "maximum number of PDSCH assignable within a slot" to "maximum number of PDSCHs schedulable by DCI transmitted in a specific PDCCH group among PDSCHs assignable within a slot (or in the case where the maximum numbers of PDSCHs schedulable by DCIs transmitted in PDCCH groups are differ from each other, largest, smallest, or average value of them)" in order to configure the type-1 HARQ-ACK codebook. The CORESET group may be understood as a set of one or more per-TRP CORESETs, i.e., a set of CORESETs with the same activate TCI state.

Figure 20:
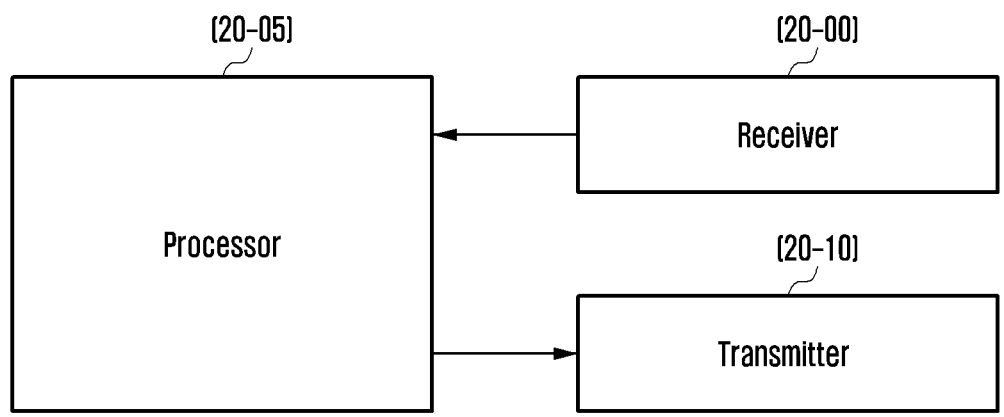
FIG. 20 illustrates a terminal according to an embodiment.

FIG. 20 illustrates a terminal according to an embodiment.

Referring to FIG. 20, the terminal includes a receiver 20-00, a transmitter 20-10, and a processor 20-05. The receiver 20-00 and the transmitter 20-10 may be collectively referred to as a transceiver. The receiver 20-00, the transmitter 20-10, and the processor 20-05 may operate to execute the above described communication methods. The configuration of the terminal is not limited to the illustrated components, but may be configured with more components (e.g., a memory) or fewer components. The receiver 20-00, the transmitter 20-10, and the processor 20-05 may be integrated into a chip.

The receiver 20-00 and transmitter 20-10 (or the transceiver) may communicate signals with a base station. The signals may include control information and data. The transceiver may include a radio frequency (RF) transmitter for performing frequency up-conversion and amplification on transmit signals and an RF receiver for performing low-noise amplification and frequency down-conversion on receive signals. Additionally, the components of the transceiver are not limited to the RF transceiver and the RF receiver.

The transceiver may receive a signal over a radio channel and proceed to send the signal to the processor 20-05 and transmit a signal output from the processor 20-05 over the radio channel.

A memory may store programs and data for the operation of the terminal. The memory may also store control information or data acquired by the terminal. The memory may include one or a combination of storage media such as a read only memory (ROM), a random access memory (RAM), a hard disc, and a compact disc read only memory (CD-ROM).

The processor 20-05 may control overall operations of the terminal according to one of disclosed embodiments. The processor 20-05 may be implemented as a controller or one or more processors.

Figure 21:
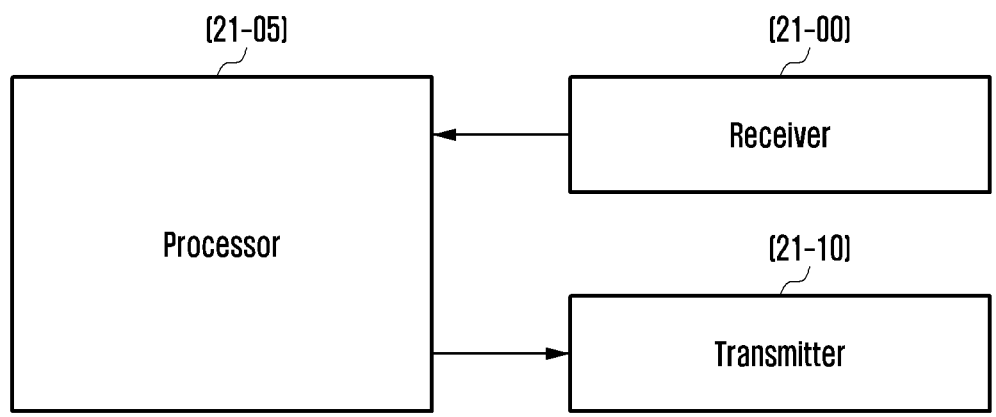
FIG. 21 illustrates a base station according to an embodiment.

FIG. 21 illustrates a base station according to an embodiment.

Referring to FIG. 21, the base station includes a receiver 21-00, a transmitter 21-10, and a processor 21-05. The receiver 21-00 and transmitter 21-10 may be collectively referred to as a transceiver. The receiver 21-00, the transmitter 21-10, and the processor 21-05 may operate to execute the above described communication method. The configuration of the base station is not limited to the illustrated components, but may include more components (e.g., a memory) or fewer components. The receiver 21-00, the transmitter 21-10, and the processor 21-05 may be integrated into a chip.

The receiver 21-00 and transmitter 21-10 (or the transceiver) may communicate signals with a terminal. The signals may include control information and data. The transceiver may include an RF transmitter for performing frequency up-conversion and amplification on transmit signals and an RF receiver for performing low-noise amplification and frequency down-conversion on receive signals. The components of the transceiver are not limited to the RF transceiver and the RF receiver.

The transceiver may receive a signal over a radio channel and proceed to send the signal to the processor 21-05 and transmit a signal output from the processor 21-05 over the radio channel.

A memory may store programs and data for the operation of the base station. The memory may also store control information or data acquired by the base station. The memory may include one or a combination of storage media such as a ROM, a RAM, a hard disc, and a CD-ROM.

The processor 21-05 may control overall operations of the base station according to one of disclosed embodiments. The processor 21-05 may be implemented as a controller or one or more processors.

As described above, the methods and apparatuses are provided which are advantageous in terms of facilitating signal transmission and reception by efficiently configuring a HARQ-ACK codebook between a terminal and a base station.

Although the embodiments disclosed in the specification and drawings have been described using specific terms, the specification and drawings are to be regarded in an illustrative rather than a restrictive sense in order to help understand the disclosure. If necessary, the embodiments may be combined in whole or in part. For example, the disclosed embodiments 1, 2, and 3 may be combined, in part or whole, with each other to form an embodiment for the operations of a base station and a terminal. Further, it is obvious that part or all of one embodiment may be combined with part or all of another embodiment to.

While the disclosure has been shown and described with reference to certain embodiments thereof, it will be understood by those skilled in the art that various changes in form and details may be made therein without departing from the spirit and scope of the disclosure as defined by the appended claims and any equivalents thereof.

What is claimed is:

1. A method performed by a terminal in a communication system, the method comprising:

receiving a radio resource control (RRC) message including first configuration information of a hybrid automatic repeat request (HARQ)-acknowledgement/negative acknowledgement (ACK/NACK) feedback mode and second configuration information of one or more physical uplink control channel (PUCCH) resource sets, wherein each of the one or more PUCCH resource sets includes one or more PUCCH resources, and wherein the first configuration information indicates one of a separate ACK/NACK feedback mode or a joint ACK/NACK feedback mode;

receiving a first downlink control information (DCI) included in a first physical downlink control channel (PDCCH) associated with a first control resource set (CORESET), wherein the first DCI includes information indicating a first PUCCH resource among the one or more PUCCH resource sets;

receiving a second DCI included in a second PDCCH associated with a second CORESET, wherein the second DCI includes information indicating a second PUCCH resource among the one or more PUCCH resource sets; and in case that the first configuration information indicates the separate ACK/NACK feedback mode, the method further comprises:

identifying one or more first HARQ-ACK information bits of a first HARQ-ACK codebook associated with the first CORESET and identifying one or more second HARQ-ACK information bits of a second HARQ-ACK codebook associated with the second CORESET, respectively;

transmitting the one or more first HARQ-ACK information bits in the first PUCCH resource based on first spatial relation information associated with an identifier (ID) of the first PUCCH resource; and transmitting the one or more second HARQ-ACK information bits in the second PUCCH resource based on second spatial relation information associated with an ID of the second PUCCH resource, wherein the first PUCCH resource and the second PUCCH resource are in different symbols within a slot, based on the first configuration information indicating the separate ACK/NACK feedback mode, and in case that the first configuration information indicates the joint ACK/NACK feedback mode, the method further comprises:
- identifying one or more third HARQ-ACK information bits by concatenating the first HARQ-ACK codebook associated with the first CORESET followed by the second HARQ-ACK codebook associated with the second CORESET; and
- transmitting the one or more third HARQ-ACK information bits in a third PUCCH resource.

2. The method of claim 1,
wherein the first spatial relation information indicates a spatial relation between a channel state information reference signal (CSI-RS) and the first PUCCH resource.

3. The method of claim 1,
wherein the second spatial relation information indicates a spatial relation between a downlink reference signal and the second PUCCH resource.

4. The method of claim 1,
wherein a slot in which the third PUCCH resource is located is determined based on a physical downlink shared channel (PDSCH) to a HARQ feedback timing indicator of the first DCI and the second DCI.

5. A method performed by a base station in a communication system, the method comprising:
- transmitting, to a terminal, a radio resource control (RRC) message including first configuration information of a hybrid automatic repeat request (HARQ)-acknowledgement/negative acknowledgement (ACK/NACK) feedback mode and second configuration information of one or more physical uplink control channel (PUCCH) resource sets, wherein each of the one or more PUCCH resource sets includes one or more PUCCH resources and wherein the first configuration information indicates one of a separate ACK/NACK feedback mode or a joint ACK/NACK feedback mode;
- transmitting, to the terminal, a first downlink control information (DCI) included in a first physical downlink control channel (PDCCH) associated with a first control resource set (CORESET), wherein the first DCI includes information indicating a first PUCCH resource among the one or more PUCCH resource sets;
- transmitting, to the terminal, a second DCI included in a second PDCCH associated with a second CORESET, wherein the second DCI includes information indicating a second PUCCH resource among the one or more PUCCH resource sets; and
- in case that the first configuration information indicates the separate ACK/NACK feedback mode, the method further comprises:
  - receiving, from the terminal, one or more first HARQ-ACK information bits of a first HARQ-ACK codebook in the first PUCCH resource based on first spatial relation information associated with an identifier (ID) of the first PUCCH resource and receiving, from the terminal, one or more second HARQ-ACK information bits of a second HARQ-ACK codebook in the second PUCCH resource based on second spatial relation information associated with an ID of the second PUCCH resource,
  - wherein the first HARQ-ACK codebook is associated with the first CORESET,
  - wherein the second HARQ-ACK codebook is associated with the second CORESET, and
  - wherein the first PUCCH resource and the second PUCCH resource are in different symbols within a slot, based on the first configuration information indicating the separate ACK/NACK feedback mode, and
- in case that the first configuration information indicates the joint ACK/NACK feedback mode, the method further comprises:
  - receiving, from the terminal, one or more third HARQ-ACK information bits in a third PUCCH resource,
  - wherein the one or more third HARQ-ACK information bits are identified by concatenating the first HARQ-ACK codebook associated with the first CORESET followed by the second HARQ-ACK codebook associated with the second CORESET.

6. The method of claim 5,
wherein the first spatial relation information indicates a spatial relation between a channel state information reference signal (CSI-RS) and the first PUCCH resource.

7. The method of claim 5,
wherein the second spatial relation information indicates a spatial relation between a downlink reference signal and the second PUCCH resource.

8. The method of claim 5,
wherein a slot in which the third PUCCH resource is located is determined based on a physical downlink shared channel (PDSCH) to a HARQ feedback timing indicator of the first DCI and the second DCI.

9. A terminal in a communication system, the terminal comprising:
- a transceiver; and
- a controller coupled with the transceiver and configured to:
  - receive a radio resource control (RRC) message including first configuration information of a hybrid automatic repeat request (HARD)-acknowledgement/negative acknowledgement (ACK/NACK) feedback mode and second configuration information of one or more physical uplink control channel (PUCCH) resource sets, wherein each of the one or more PUCCH resource sets includes one or more PUCCH resources and wherein the first configuration information indicates one of a separate ACK/NACK feedback mode or a joint ACK/NACK feedback mode,
  - receive a first downlink control information (DCI) included in a first physical downlink control channel (PDCCH) associated with a first control resource set (CORESET), wherein the first DCI includes information indicating a first PUCCH resource among the one or more PUCCH resource sets, and
  - receive a second DCI included in a second PDCCH associated with a second CORESET, wherein the second DCI includes information indicating a second PUCCH resource among the one or more PUCCH resource sets,
  - wherein in case that the first configuration information indicates the separate ACK/NACK feedback mode, the controller is further configured to:
    - identify one or more first HARQ-ACK information bits of a first HARQ-ACK codebook associated with the first CORESET and identify one or more second HARQ-ACK information bits of a second HARQ-ACK codebook associated with the second CORESET, respectively,
    - transmit the one or more first HARQ-ACK information bits in the first PUCCH resource based on first spatial relation information associated with an identifier (ID) of the first PUCCH resource, and transmit the one or more second HARQ-ACK information bits in the second PUCCH resource based on second spatial relation information associated with an ID of the second PUCCH resource, wherein the first PUCCH resource and the second PUCCH resource are in different symbols within a slot, based on the first configuration information indicating the separate ACK/NACK feedback mode, and wherein in case that the first configuration information indicates the joint ACK/NACK feedback mode, the controller is further configured to:

identify one or more third HARQ-ACK information bits by concatenating the first HARQ-ACK codebook associated with the first CORESET followed by the second HARQ-ACK codebook associated with the second CORESET, and transmit the one or more third HARQ-ACK information bits in a third PUCCH resource.

10. The terminal of claim 9, wherein the first spatial relation information indicates a spatial relation between a channel state information reference signal (CSI-RS) and the first PUCCH resource.

11. The terminal of claim 9, wherein the second spatial relation information indicates a spatial relation between a downlink reference signal and the second PUCCH resource.

12. The terminal of claim 9, wherein a slot in which the third PUCCH resource is located is determined based on a physical downlink shared channel (PDSCH) to a HARQ feedback timing indicator of the first DCI and the second DCI.

13. A base station in a communication system, the base station comprising:
a transceiver; and
a controller configured to:
transmit, to a terminal, a radio resource control (RRC) message including first configuration information of a hybrid automatic repeat request (HARQ)-acknowledgement/negative acknowledgement (ACK/NACK) feedback mode and second configuration information of one or more physical uplink control channel (PUCCH) resource sets, wherein each of the one or more PUCCH resource sets includes one or more PUCCH resources, and wherein the first configuration information indicates one of a separate ACK/NACK feedback mode or a joint ACK/NACK feedback mode, transmit, to the terminal, a first downlink control information (DCI) included in a first physical downlink control channel (PDCCH) associated with a first control resource set (CORESET), wherein the first DCI includes information indicating a first PUCCH resource among the one or more PUCCH resource sets, and transmit, to the terminal, a second DCI included in a second PDCCH associated with a second CORESET, wherein the second DCI includes information indicating a second PUCCH resource among the one or more PUCCH resource sets, wherein in case that the first configuration information indicates the separate ACK/NACK feedback mode, the controller is further configured to:

receive, from the terminal, one or more first HARQ-ACK information bits of a first HARQ-ACK codebook in the first PUCCH resource based on first spatial relation information associated with an identifier (ID) of the first PUCCH resource and receive, from the terminal, one or more second HARQ-ACK information bits of a second HARQ-ACK codebook in the second PUCCH resource based on second spatial relation information associated with an ID of the second PUCCH resource, wherein the first HARQ-ACK codebook is associated with the first CORESET, wherein the second HARQ-ACK codebook is associated with the second CORESET, and wherein the first PUCCH resource and the second PUCCH resource are in different symbols within a slot, based on the first configuration information indicating the separate ACK/NACK feedback mode, and wherein in case that the first configuration information indicates the joint ACK/NACK feedback mode, the controller is further configured to:

receive, from the terminal, one or more third HARQ-ACK information bits in a third PUCCH resource, wherein the one or more third HARQ-ACK information bits are identified by concatenating the first HARQ-ACK codebook associated with the first CORESET followed by the second HARQ-ACK codebook associated with the second CORESET.

14. The base station of claim 13, wherein the first spatial relation information indicates a spatial relation between a channel state information reference signal (CSI-RS) and the first PUCCH resource.

15. The base station of claim 13, wherein the second spatial relation information indicates a spatial relation between a downlink reference signal and the second PUCCH resource.

16. The base station of claim 13, wherein a slot in which the third PUCCH resource is located is determined based on a physical downlink shared channel (PDSCH) to a HARQ feedback timing indicator of the first DCI and the second DCI.

* * * * *